US012249313B2

(12) United States Patent
Hassid et al.

(10) Patent No.: US 12,249,313 B2
(45) Date of Patent: Mar. 11, 2025

(54) METHOD AND SYSTEM FOR TEXT-TO-SPEECH SYNTHESIS OF STREAMING TEXT

(71) Applicant: GOOGLE LLC, Mountain View, CA (US)

(72) Inventors: Michael Hassid, Jerusalem (IL); Sapir Caduri, Tel Aviv (IL); Nadav Bar, Raanana (IL); Danielle Cohen, Tel Aviv (IL); Benny Schlesinger, Ramat Hasharon (IL); Michelle Tadmor Ramanovich, Tel Aviv (IL)

(73) Assignee: Google LLC, Mountain View, CA (US)

( * ) Notice: Subject to any disclaimer, the term of this patent is extended or adjusted under 35 U.S.C. 154(b) by 38 days.

(21) Appl. No.: 17/914,010

(22) PCT Filed: Oct. 27, 2020

(86) PCT No.: PCT/US2020/057529

§ 371 (c)(1),
(2) Date: Sep. 23, 2022

(87) PCT Pub. No.: WO2022/093192

PCT Pub. Date: May 5, 2022

(65) Prior Publication Data

US 2023/0335111 A1 Oct. 19, 2023

(51) Int. Cl.
*G10L 13/08* (2013.01)
*G10L 13/00* (2006.01)

(52) U.S. Cl.
CPC .............. *G10L 13/08* (2013.01); *G10L 13/00* (2013.01); *G10L 2013/083* (2013.01)

(58) Field of Classification Search
CPC .... G10L 13/08; G10L 2013/083; G10L 13/00
See application file for complete search history.

(56) References Cited

U.S. PATENT DOCUMENTS

| | | | |
|---|---|---|---|
| 6,212,501 | B1 | 4/2001 | Kaseno |
| 6,778,961 | B2 | 8/2004 | Walker et al. |

(Continued)

FOREIGN PATENT DOCUMENTS

| | | | |
|---|---|---|---|
| CN | 101155291 | A | 4/2008 |
| CN | 102592594 | A | 7/2012 |

(Continued)

OTHER PUBLICATIONS

The International Search Report (ISR) with Written Opinion for PCT/US2020/057529 dated Jul. 26, 2021, pp. 1-15.
Xiao Chen et al., "Experimental comparison of text information based punctuation recovery algorithms in real data," Proceedings of 2013 3rd International Conference on Computer Science and Network Technology, 2013, Abstract.

*Primary Examiner* — Samuel G Neway
(74) *Attorney, Agent, or Firm* — MCDONNELL BOEHNEN HULBERT & BERGHOFF LLP

(57) ABSTRACT

A method and system is disclosed for speech synthesis of streaming text. At a text-to-speech ("ITS) system, a real-time streaming text string having a starting point and an ending point may be received, and a first sub-string comprising a first portion of the text string received from an initial point to a first trigger point may be accumulated. The initial point is no earlier than the starting point and is prior to the first trigger point, and the first trigger point is no further than the ending point. A punctuation model of the ITS system may be applied to the first sub-string to generate a pre-processed first sub-string comprising the first sub-string with added grammatical punctuation as determined by the punctuation model. TTS synthesis processing may be applied to at least the pre-processed first sub-string to generate first synthesized speech, and audio play out of the first synthesized speech produced.

17 Claims, 12 Drawing Sheets

(56) References Cited

U.S. PATENT DOCUMENTS

| | | | | |
|---|---|---|---|---|
| 8,060,565 | B1 * | 11/2011 | Swartz | G10L 13/00 704/4 |
| 8,566,088 | B2 | 10/2013 | Pinson et al. | |
| 8,849,669 | B2 | 9/2014 | Bakis et al. | |
| 10,140,973 | B1 * | 11/2018 | Dalmia | G06N 7/01 |
| 10,573,312 | B1 | 2/2020 | Thomson et al. | |
| 2008/0077390 | A1 | 3/2008 | Nagao | |
| 2009/0276396 | A1 | 11/2009 | Gorman et al. | |
| 2009/0313020 | A1 | 12/2009 | Koivunen | |
| 2011/0282812 | A1 | 11/2011 | Chandramouli et al. | |
| 2017/0062010 | A1 * | 3/2017 | Pappu | G11B 27/105 |
| 2018/0082675 | A1 * | 3/2018 | Wang | G10L 13/10 |
| 2020/0045130 | A1 * | 2/2020 | Rastrow | H04M 3/527 |
| 2021/0158795 | A1 * | 5/2021 | Liu | G10L 25/63 |
| 2021/0365632 | A1 * | 11/2021 | Trim | G06N 20/00 |
| 2023/0335111 | A1 * | 10/2023 | Hassid | G10L 13/08 |

FOREIGN PATENT DOCUMENTS

| | | | |
|---|---|---|---|
| CN | 107767870 | A | 3/2018 |
| CN | 108932226 | A | 12/2018 |
| CN | 109255115 | A | 1/2019 |
| CN | 109918666 | A | 6/2019 |
| CN | 110852075 | A | 2/2020 |
| CN | 111241810 | A | 6/2020 |
| CN | 111581911 | A | 8/2020 |
| TW | I582755 | B | 5/2017 |
| WO | 1996/22594 | | 7/1996 |
| WO | 2014/117553 | A1 | 8/2014 |
| WO | 2020/198799 | | 10/2020 |

* cited by examiner

METHOD AND SYSTEM FOR TEXT-TO-SPEECH SYNTHESIS OF STREAMING TEXT

CROSS REFERENCE TO RELATED APPLICATIONS

The present application is a national stage entry of, and claims priority to, PCT/US2020/57529, filed on Oct. 27, 2020, which is hereby incorporated in its entirety herein by reference.

BACKGROUND

Unless otherwise indicated herein, the materials described in this section are not prior art to the claims in this application and are not admitted to be prior art by inclusion in this section.

A goal of automatic speech recognition (ASR) technology is to map a particular utterance, or speech sample, to an accurate textual representation, or other symbolic representation, of that utterance. For instance, ASR performed on the utterance “my dog has fleas” would ideally be mapped to the text string “my dog has fleas,” rather than the nonsensical text string “my dog has freeze,” or the reasonably sensible but inaccurate text string “my bog has trees.”

A goal of speech synthesis technology is to convert written language into speech that can be output in an audio format, for example directly or stored as an audio file suitable for audio output. This speech synthesis can be performed by a text-to-speech (TTS) system. The written language could take the form of text, or symbolic linguistic representations. The speech may be generated as a waveform by a speech synthesizer, which produces artificial human speech. Natural sounding human speech may also be a goal of a speech synthesis system.

Various technologies, including computers, network servers, telephones, and personal digital assistants (PDAs), can be employed to implement an ASR system and/or a speech synthesis system, or one or more components of such systems. Communication networks may in turn provide communication paths and links between some or all of such devices, supporting speech synthesis system capabilities and services that may utilize ASR and/or speech synthesis system capabilities.

BRIEF SUMMARY

In one aspect, an example embodiment presented herein provides a method comprising: at a text-to-speech (TTS) system, receiving a real-time streaming text string having a starting point and an ending point; at the TTS system, accumulating a first sub-string comprising a first portion of the text string received from an initial point to a first trigger point, wherein the initial point is no earlier than the starting point and is prior to the first trigger point, and the first trigger point is no further than the ending point, at the TTS system, applying a punctuation model of the TTS system to the first sub-string to generate a pre-processed first sub-string comprising the first sub-string with added grammatical punctuation as determined by the punctuation model; at the TTS system, applying TTS synthesis processing to at least the pre-processed first sub-string to generate first synthesized speech; and producing audio playout of the first synthesized speech.

In another respect, an example embodiment presented herein provides a system including a text-to-speech (TTS) system implemented on an apparatus comprising: one or more processors; memory; and machine-readable instructions stored in the memory, that upon execution by the one or more processors cause the TTS system to carry out operations including: receiving a real-time streaming text string having a starting point and an ending point; accumulating a first sub-string comprising a first portion of the text string received from an initial point to a first trigger point, wherein the initial point is no earlier than the starting point and is prior to the first trigger point, and the first trigger point is no further than the ending point; applying a punctuation model of the TTS system to the first sub-string to generate a pre-processed first sub-string comprising the first sub-string with added grammatical punctuation as determined by the punctuation model; applying TTS synthesis processing to at least the pre-processed first sub-string to generate first synthesized speech; and producing audio playout of the first synthesized speech.

In yet another aspect, an example embodiment presented herein provides an article of manufacture including a computer-readable storage medium having stored thereon program instructions that, upon execution by one or more processors of a system including a text-to-speech (TTS) system, cause the system to perform operations comprising: receiving a real-time streaming text string having a starting point and an ending point; accumulating a first sub-string comprising a first portion of the text string received from an initial point to a first trigger point, wherein the initial point is no earlier than the starting point and is prior to the first trigger point, and the first trigger point is no further than the ending point; applying a punctuation model of the TTS system to the first sub-string to generate a pre-processed first sub-string comprising the first sub-string with added grammatical punctuation as determined by the punctuation model; applying TTS synthesis processing to at least the pre-processed first sub-string to generate first synthesized speech; and producing audio playout of the first synthesized speech.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1:
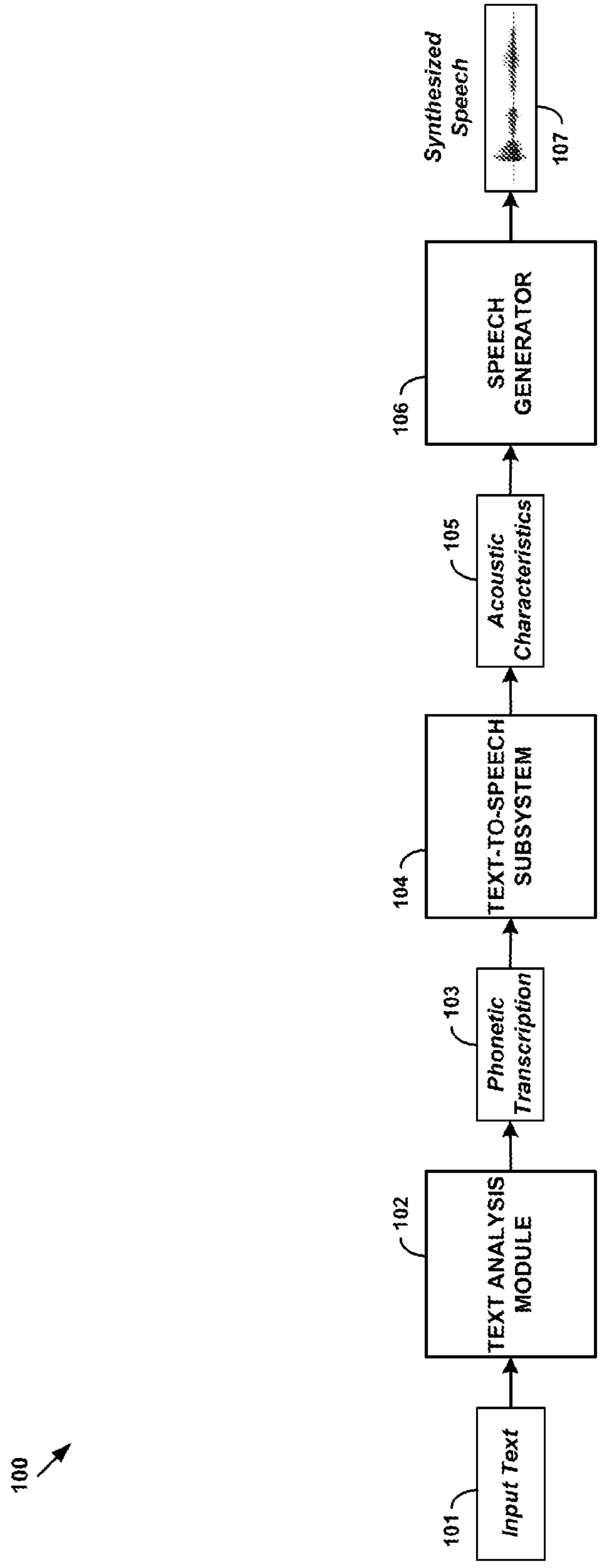
FIG. 1 depicts a simplified block diagram of an example text-to-speech system, in accordance with an example embodiment.

A speech synthesis system can be a processor-based system configured to convert written language into artificially produced speech or spoken language. The written language could be written text, such as one or more written sentences or text strings, for example. The written language could also take the form of other symbolic representations, such as a speech synthesis mark-up language, which may include information indicative of speaker emotion, speaker gender, speaker identification, as well as speaking styles. The source of the written text could be input from a keyboard or keypad of a computing device, such as a portable computing device (e.g., a PDA, smartphone, etc.), or could be from a file stored on one or another form of computer readable storage medium, or from a remote source, such as a webpage, accessed over a network. The artificially produced speech could be generated as a waveform from a signal generation device or module (e.g., a speech synthesizer device), and output by an audio playout device and/or formatted and recorded as an audio file on a tangible recording medium. The synthesized speech could also be played out over a network connection to an audio device, such as a conventional phone or smartphone. Such a system may also be referred to as a "text-to-speech" (TTS) system, although the written form may not necessarily be limited to only text.

A speech synthesis system may operate by receiving input text (or other form of written language), and translating the written text into a "phonetic transcription" corresponding to a symbolic representation of how the spoken rendering of the text sounds or should sound. The phonetic transcription may then be mapped to speech features that parameterize an acoustic rendering of the phonetic transcription, and which then serve as input data to a signal generation module device or element that can produce an audio waveform suitable for playout by an audio output device. The playout may sound like a human voice speaking the words (or sounds) of the input text string, for example. In the context of speech synthesis, the more natural the sound (e.g., to the human ear) of the synthesized voice, generally the better the voice-quality ranking of the system. A more natural sound can also reduce computational resources in some cases, since subsequent exchanges with a user to clarify the meaning of the output can be reduced. The audio waveform could also be generated as an audio file that may be stored or recorded on storage media suitable for subsequent playout. In some embodiments, speech may be synthesized directly from text, without necessarily generating phonetic transcriptions.

In operation, a TTS system may be used to convey information from an apparatus (e.g. a processor-based device or system) to a user, such as messages, prompts, answers to questions, instructions, news, emails, and speech-to-speech translations, among other information. Speech signals may themselves carry various forms or types of information, including linguistic content, affectual state (e.g., emotion and/or mood), physical state (e.g., physical voice characteristics), and speaker identity, to name a few.

In example embodiments, speech synthesis may use parametric representations of speech with symbolic descriptions of phonetic and linguistic content of text. A TTS system may be trained using data consisting mainly of numerous speech samples and corresponding text strings (or other symbolic renderings). For practical reasons, the speech samples are usually recorded, although they need not be in principle. By construction, the corresponding text strings are in, or generally accommodate, a written storage format. Recorded speech samples and their corresponding text strings can thus constitute training data for a TTS system.

One example of a TTS is based on hidden Markov models (HMMs). In this approach, HMMs are used to model statistical probabilities associating phonetic transcriptions of input text strings with parametric representations of the corresponding speech to be synthesized. As another example, a TTS may be based on some form of machine learning to generate a parametric representation of speech to synthesize speech. For example, an artificial neural network (ANN) may be used to generate speech parameters by training the ANN to associate known phonetic transcriptions with known parametric representations of speech sounds. Both HMM-based speech synthesis and ANN-based speech synthesis can facilitate altering or adjusting characteristics of the synthesized voice using one or another form of statistical adaptation. Other forms of TTS systems are possible as well.

In conventional operation, text samples of TTS training data include grammatical punctuation, such as commas, periods, question marks, and exclamation marks. As such, a TTS system may be trained to, at runtime, generate "predicted" speech that can convey (in tone and/or volume, for example) meaning, intent, or content, for example, beyond just the written words of input runtime text. In some applications of TTS, however, runtime text may contain little or no grammatical punctuation. A non-limiting example is a texting application program on a smartphone, in which typical user input may partly or entirely lack grammatical punctuation. TTS processing of this form of text, which may be referred to as "streaming text" or "real-time" text, can present a challenge for a conventionally trained TS system, and the resulting synthesized speech in such instances may sound flat or unnatural, or worse. It would therefore be desirable to be able to synthesize natural sounding speech from text that is partly or wholly deficient in grammatical punctuation. The inventors have discovered how to do this.

In accordance with example embodiments, a "punctuation model" may be added to or integrated into a TTS system. The punctuation model may applied to runtime input text in order to add grammatical punctuation to the text, prior to synthesis processing. The resulting synthesized speech may then sound more natural than synthesis of the unpunctuated input text. In example embodiments, the punctuation model may be based on machine learning and/or other artificial intelligence techniques, and trained to generate output text including grammatical punctuation from input text that contains little or no punctuation. In addition to improving the quality of synthesized speech, punctuation may be added incrementally in real-time as streaming text is received, and used to subdivide the arriving streaming text into sequential sub-strings that can be incrementally processed into synthesized speech. Such piece-wise, incremental processing can enable TTS synthesizing of one sub-string while concurrently receiving as subsequent sub-string, thereby reducing the time it takes to generate synthesized speech from the first to the last streaming text character.

2. Example Text-to-Speech System

A TTS synthesis system (or more generally, a speech synthesis system) may operate by receiving input text, processing the text into a symbolic representation of the phonetic and linguistic content of the text string, generating a sequence of speech features corresponding to the symbolic representation, and providing the speech features as input to a speech synthesizer in order to produce a spoken rendering of the input text. The symbolic representation of the phonetic and linguistic content of the text may take the form of a sequence of labels, each label identifying a low-level phonetic speech unit, such as a phoneme, and further identifying or encoding higher-level linguistic and/or syntactic context, temporal parameters, and other information for specifying how to render the symbolically-represented sounds as meaningful speech in a given language. Other speech characteristics may include pitch, frequency, speaking pace, and intonation (e.g., statement tone, question tone, etc.). At least some of these characteristics are sometimes referred to as "prosody."

In accordance with example embodiments, the phonetic speech units of a phonetic transcription could be phonemes. A phoneme may be considered to be the smallest acoustic segment of speech of a given language that encompasses a meaningful contrast with other speech segments of the given language. Thus, a word typically includes one or more phonemes. For purposes of simplicity, phonemes may be thought of as utterances of letters, although this is not a perfect analogy, as some phonemes may present multiple letters. In written form, phonemes are typically represented as one or more letters or symbols within some type of delimiter that signifies the text as representing a phoneme. As an example, the phonemic spelling for the American English pronunciation of the word "cat" is /k/ /ae/ /t/, and consists of the phonemes /k/, /ae/, and /t/. Another example is the phonemic spelling for the word "dog" is /d/ /aw/ /g/, consisting of the phonemes /d/, /aw/, and /g/. Different phonemic alphabets exist, and other phonemic representations are possible. Common phonemic alphabets for American English contain about 40 distinct phonemes. Other languages may be described by different phonemic alphabets containing different phonemes.

The phonetic properties of a phoneme in an utterance can depend on, or be influenced by, the context in which it is (or is intended to be) spoken. For example, a "triphone" is a triplet of phonemes in which the spoken rendering of a given phoneme is shaped by a temporally-preceding phoneme, referred to as the "left context," and a temporally-subsequent phoneme, referred to as the "right context." Thus, the ordering of the phonemes of English-language triphones corresponds to the direction in which English is read. Other phoneme contexts, such as quinphones, may be considered as well.

In addition to phoneme-level context, phonetic properties may also depend on higher-level context such as words, phrases, and sentences, for example. Higher-level context is generally associated with language usage, which may be characterized by a language model. In written text, language usage may be conveyed, at least partially, by grammatical punctuation. In particular, grammatical punctuation can provide high-level context relating to speech rhythm, intonation, and other nuances of articulation.

Speech features represent acoustic properties of speech as parameters, and in the context of speech synthesis, may be used for driving generation of a synthesized waveform corresponding to an output speech signal. Generally, features for speech synthesis account for three major components of speech signals, namely spectral envelopes that resemble the effect of the vocal tract, excitation that simulates the glottal source, and, as noted, prosody, which describes pitch contour ("melody") and tempo (rhythm). In practice, features may be represented in multidimensional feature vectors that correspond to one or more temporal frames. One of the basic operations of a TTS synthesis system is to map a phonetic transcription (e.g., a sequence of labels) to an appropriate sequence of feature vectors.

By way of example, the features may include Mel Filter Cepstral Coefficients (MFCC) coefficients. MFCC may represent the short-term power spectrum of a portion of an input utterance, and may be based on, for example, a linear cosine transform of a log power spectrum on a nonlinear Mel scale of frequency. (A Mel scale may be a scale of pitches subjectively perceived by listeners to be about equally distant from one another, even though the actual frequencies of these pitches are not equally distant from one another.)

In some embodiments, a feature vector may include MFCC, first-order cepstral coefficient derivatives, and second-order cepstral coefficient derivatives. For example, the feature vector may contain 13 coefficients, 13 first-order derivatives ("delta"), and 13 second-order derivatives ("delta-delta"), therefore having a length of 39. However, feature vectors may use different combinations of features in other possible embodiments. As another example, feature vectors could include Perceptual Linear Predictive (PLP) coefficients, Relative Spectral (RASTA) coefficients, Filterbank log-energy coefficients, or some combination thereof. Each feature vector may be thought of as including a quantified characterization of the acoustic content of a corresponding temporal frame of the utterance (or more generally of an audio input signal).

FIG. 1 depicts a simplified block diagram of an example text-to-speech (TTS) synthesis system 100, in accordance with an example embodiment. In addition to functional components, FIG. 1 also shows selected example inputs, outputs, and intermediate products of example operation. The functional components of the TTS synthesis system 100 include a text analysis module 102 for converting input text 101 into a phonetic transcription 103, a TTS subsystem 104 for generating data representing acoustic characteristics 105 of the to-be-synthesized speech from the phonetic transcription 103, and a speech generator 106 to generate the synthesized speech 107 from the acoustic characteristics 105. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

It should be noted that the discussion in this section, and the accompanying figures, are presented for purposes of illustration and by way of example. For example, the TTS subsystem 104 could be implemented using an HMM model for generating speech features at runtime based on learned (trained) associations between known labels and known parameterized speech. As another example, the TTS subsystem 104 could be implemented using a machine-learning model, such as an artificial neural network (ANN), for generating speech features at runtime from associations between known labels and known parameterized speech, where the associations are learned through training with known associations. In still another example, a TTS subsystem could employ a hybrid HMM-ANN model.

In accordance with example embodiments, the text analysis module 102 may receive input text 101 (or other form of text-based input) and generate a phonetic transcription 103 as output. The input text 101 could be a text message, email, chat input, book passage, article, or other text-based communication, for example. As described above, the phonetic transcription could correspond to a sequence of labels that identify speech units, such as phonemes, possibly as well as context information.

As shown, the TTS subsystem 104 may employ HMM-based or ANN-based speech synthesis to generate feature vectors corresponding to the phonetic transcription 103. The feature vectors may include quantities that represent acoustic characteristics 105 of the speech to be generated. For example, the acoustic characteristics may include pitch, fundamental frequency, pace (e.g., speed of speech), and prosody. Other acoustic characteristics as possible as well.

The acoustic characteristics may be input to the speech generator 106, which generates that synthesized speech 107 as output. The synthesize speech 107 could be generated as actual audio output, for example from an audio device having a speaker or speakers (e.g., headphones, ear-buds, or loudspeaker, or the like), and/or as digital data that may be recorded and played out from a data file (e.g., a wave file, or the like).

Although not necessarily shown explicitly in FIG. 1, the TTS system 100 may also employ a language model in order to predict high-level context for interpretation of the phonetic transcription 103 and generation of acoustic characteristics 105 that can be rendered as natural sounding speech by the speech generator 106. The accuracy of a language model's predictions may depend, at least in part, on structural features in the input text 101, including grammatical punctuation. As discussed above, the absence of grammatical punctuation in written text can dilute or eliminate these aspects of high-level context, resulting in poorly or deficiently determined phonetic properties. Thus, a TTS system trained using punctuated text and corresponding speech samples, as is typical, may fail to generate natural sounding speech from text input that lacks grammatical punctuation. A non-limiting example of input text lacking or deficient in grammatical punctuation is streaming text, such as that generated by a texting application program.

Example embodiments described herein adapt conventional TTS processing to be able to generate natural sounding speech from text input that otherwise lacks or is deficient in grammatical punctuation. In particular, example embodiments introduce a punctuation model that can create a grammatically punctuated rendering of input text, which may then be processed by a TTS subsystem to generate natural sounding speech. Before describing example embodiments of a TTS system adapted for accommodating punctuation-deficient text, a discussion of an example communication system and device architecture in which example embodiments of TTS synthesis with punctuation modeling may be implemented is presented.

3. Example Communication System and Device Architecture

Methods in accordance with an example embodiment, such as the one described above, devices, could be implemented using so-called "thin clients" and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

a. Example Communication System

Figure 2:
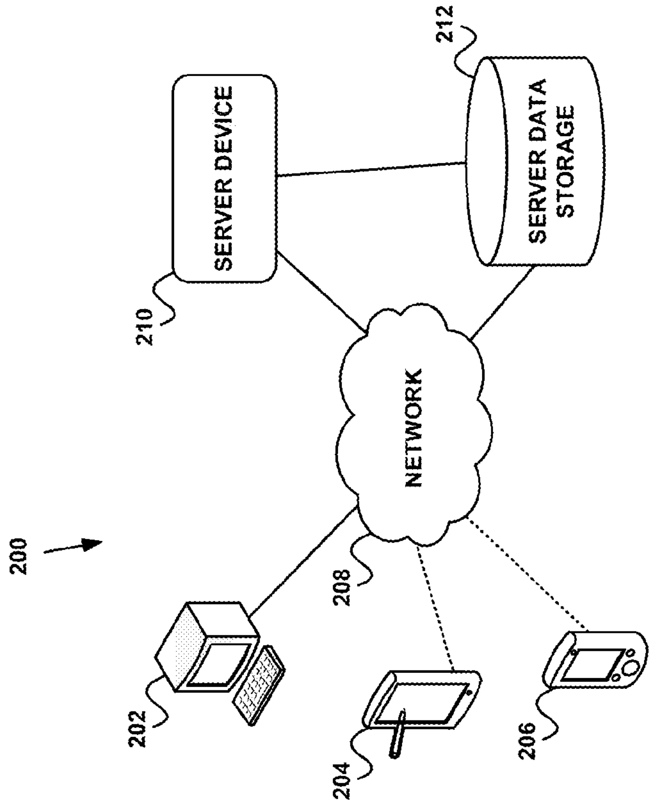
FIG. 2 is a block diagram of an example network and computing architecture, in accordance with an example embodiment.

FIG. 2 is a simplified block diagram of a communication system 200, in which various embodiments described herein can be employed. Communication system 200 includes client devices 202, 204, and 206, which represent a desktop personal computer (PC), a tablet computer, and a mobile phone, respectively. Client devices could also include wearable computing devices, such as head-mounted displays and/or augmented reality displays, for example. Each of these client devices may be able to communicate with other devices (including with each other) via a network 208 through the use of wireline connections (designated by solid lines) and/or wireless connections (designated by dashed lines).

Network 208 may be, for example, the Internet, or some other form of public or private Internet Protocol (IP) network. Thus, client devices 202, 204, and 206 may communicate using packet-switching technologies. Nonetheless, network 208 may also incorporate at least some circuit-switching technologies, and client devices 202, 204, and 206 may communicate via circuit switching alternatively or in addition to packet switching.

A server device 210 may also communicate via network 208. In particular, server device 210 may communicate with client devices 202, 204, and 206 according to one or more network protocols and/or application-level protocols to facilitate the use of network-based or cloud-based computing on these client devices. Server device 210 may include integrated data storage (e.g., memory, disk drives, etc.) and may also be able to access a separate server data storage 212. Communication between server device 210 and server data storage 212 may be direct, via network 208, or both direct and via network 208 as illustrated in FIG. 2. Server data storage 212 may store application data that is used to facilitate the operations of applications performed by client devices 202, 204, and 206 and server device 210.

Although only three client devices, one server device, and one server data storage are shown in FIG. 2, communication system 200 may include any number of each of these components. For instance, communication system 200 may comprise millions of client devices, thousands of server devices and/or thousands of server data storages. Furthermore, client devices may take on forms other than those in FIG. 2.

b. Example Server Device and Server System

Figure 3A:
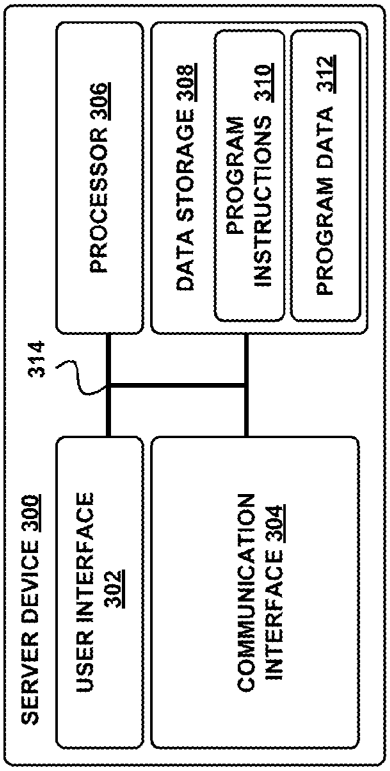
FIG. 3A is a block diagram of a server device, in accordance with an example embodiment.

FIG. 3A is a block diagram of a server device in accordance with an example embodiment. In particular, server device 300 shown in FIG. 3A can be configured to perform one or more functions of server device 210 and/or server data storage 212. Server device 300 may include a user interface 302, a communication interface 304, processor 306, and data storage 308, all of which may be linked together via a system bus, network, or other connection mechanism 314.

User interface 302 may comprise user input devices such as a keyboard, a keypad, a touch screen, a computer mouse, a track ball, a joystick, and/or other similar devices, now known or later developed. User interface 302 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 302 may be configured to generate audible output(s), via a speaker, speaker jack, audio output port, audio output device, earphones, and/or other similar devices, now known or later developed. In some embodiments, user interface 302 may include software, circuitry, or another form of logic that can transmit data to and/or receive data from external user input/output devices.

Communication interface 304 may include one or more wireless interfaces and/or wireline interfaces that are configurable to communicate via a network, such as network 208 shown in FIG. 2. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 304 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 306 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 306 may be configured to execute computer-readable program instructions 310 that are contained in data storage 308, and/or other instructions, to carry out various functions described herein.

Data storage 308 may include one or more non-transitory computer-readable storage media that can be read or accessed by processor 306. The one or more computer-readable storage media may include volatile and/or non-volatile storage components, such as optical, magnetic, organic or other memory or disc storage, which can be integrated in whole or in part with processor 306. In some embodiments, data storage 308 may be implemented using a single physical device (e.g., one optical, magnetic, organic or other memory or disc storage unit), while in other embodiments, data storage 308 may be implemented using two or more physical devices.

Data storage 308 may also include program data 312 that can be used by processor 306 to carry out functions described herein. In some embodiments, data storage 308 may include, or have access to, additional data storage components or devices (e.g., cluster data storages described below).

Referring again briefly to FIG. 2, server device 210 and server data storage device 212 may store applications and application data at one or more locales accessible via network 208. These locales may be data centers containing numerous servers and storage devices. The exact physical location, connectivity, and configuration of server device 210 and server data storage device 212 may be unknown and/or unimportant to client devices. Accordingly, server device 210 and server data storage device 212 may be referred to as "cloud-based" devices that are housed at various remote locations. One possible advantage of such "cloud-based" computing is to offload processing and data storage from client devices, thereby simplifying the design and requirements of these client devices.

In some embodiments, server device 210 and server data storage device 212 may be a single computing device residing in a single data center. In other embodiments, server device 210 and server data storage device 212 may include multiple computing devices in a data center, or even multiple computing devices in multiple data centers, where the data centers are located in diverse geographic locations. For example, FIG. 2 depicts each of server device 210 and server data storage device 212 potentially residing in a different physical location.

Figure 3B:
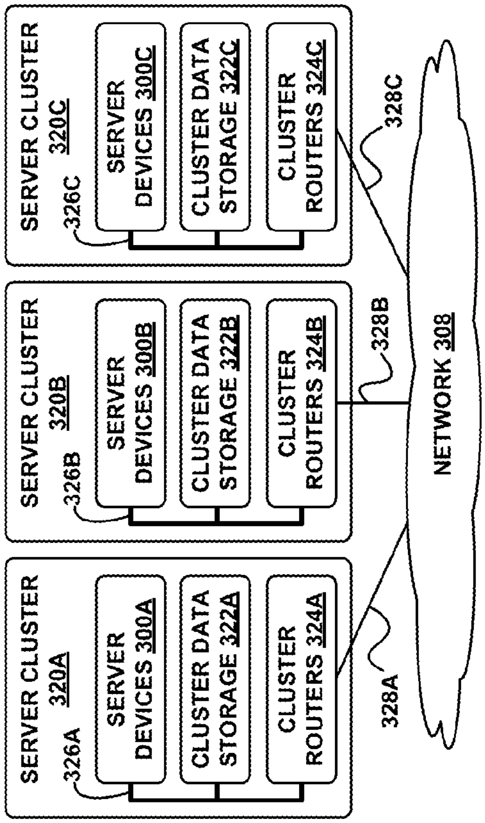
FIG. 3B depicts a cloud-based server system, in accordance with an example embodiment.

FIG. 3B depicts an example of a cloud-based server cluster. In FIG. 3B, functions of server device 210 and server data storage device 212 may be distributed among three server clusters 320A, 320B, and 320C. Server cluster 320A may include one or more server devices 300A, cluster data storage 322A, and cluster routers 324A connected by a local cluster network 326A. Similarly, server cluster 320B may include one or more server devices 300B, cluster data storage 322B, and cluster routers 324B connected by a local cluster network 326B. Likewise, server cluster 320C may include one or more server devices 300C, cluster data storage 322C, and cluster routers 324C connected by a local cluster network 326C. Server clusters 320A, 320B, and 320C may communicate with network 308 via communication links 328A, 328B, and 328C, respectively.

In some embodiments, each of the server clusters 320A, 320B, and 320C may have an equal number of server devices, an equal number of cluster data storages, and an equal number of cluster routers. In other embodiments, however, some or all of the server clusters 320A, 320B, and 320C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 320A, for example, server devices 300A can be configured to perform various computing tasks of a server, such as server device 210. In one embodiment, these computing tasks can be distributed among one or more of server devices 300A. Server devices 300B and 300C in server clusters 320B and 320C may be configured the same or similarly to server devices 300A in server cluster 320A. On the other hand, in some embodiments, server devices 300A, 300B, and 300C each may be configured to perform different functions. For example, server devices 300A may be configured to perform one or more functions of server device 210, and server devices 300B and server device 300C may be configured to perform functions of one or more other server devices. Similarly, the functions of server data storage device 212 can be dedicated to a single server cluster, or spread across multiple server clusters.

Cluster data storages 322A, 322B, and 322C of the server clusters 320A, 320B, and 320C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 210 and server data storage device 212 can be distributed across server clusters 320A, 320B, and 320C, various active portions and/or backup/redundant portions of these components can be distributed across cluster data storages 322A, 322B, and 322C. For example, some cluster data storages 322A, 322B, and 322C may be configured to store backup versions of data stored in other cluster data storages 322A, 322B, and 322C.

Cluster routers 324A, 324B, and 324C in server clusters 320A, 320B, and 320C, respectively, may include networking equipment configured to provide internal and external communications for the server clusters. For example, cluster routers 324A in server cluster 320A may include one or more packet-switching and/or routing devices configured to provide (i) network communications between server devices 300A and cluster data storage 322A via cluster network 326A, and/or (ii) network communications between the server cluster 320A and other devices via communication link 328A to network 308. Cluster routers 324B and 324C may include network equipment similar to cluster routers 324A, and cluster routers 324B and 324C may perform networking functions for server clusters 320B and 320C that cluster routers 324A perform for server cluster 320A.

Additionally, the configuration of cluster routers 324A, 324B, and 324C can be based at least in part on the data communication requirements of the server devices and cluster storage arrays, the data communications capabilities of the network equipment in the cluster routers 324A, 324B, and 324C, the latency and throughput of the local cluster networks 326A, 326B, 326C, the latency, throughput, and cost of the wide area network connections 328A, 328B, and 328C, and/or other factors that may contribute to the cost, speed, fault-tolerance, resiliency, efficiency and/or other design goals of the system architecture.

c. Example Client Device

Figure 4:
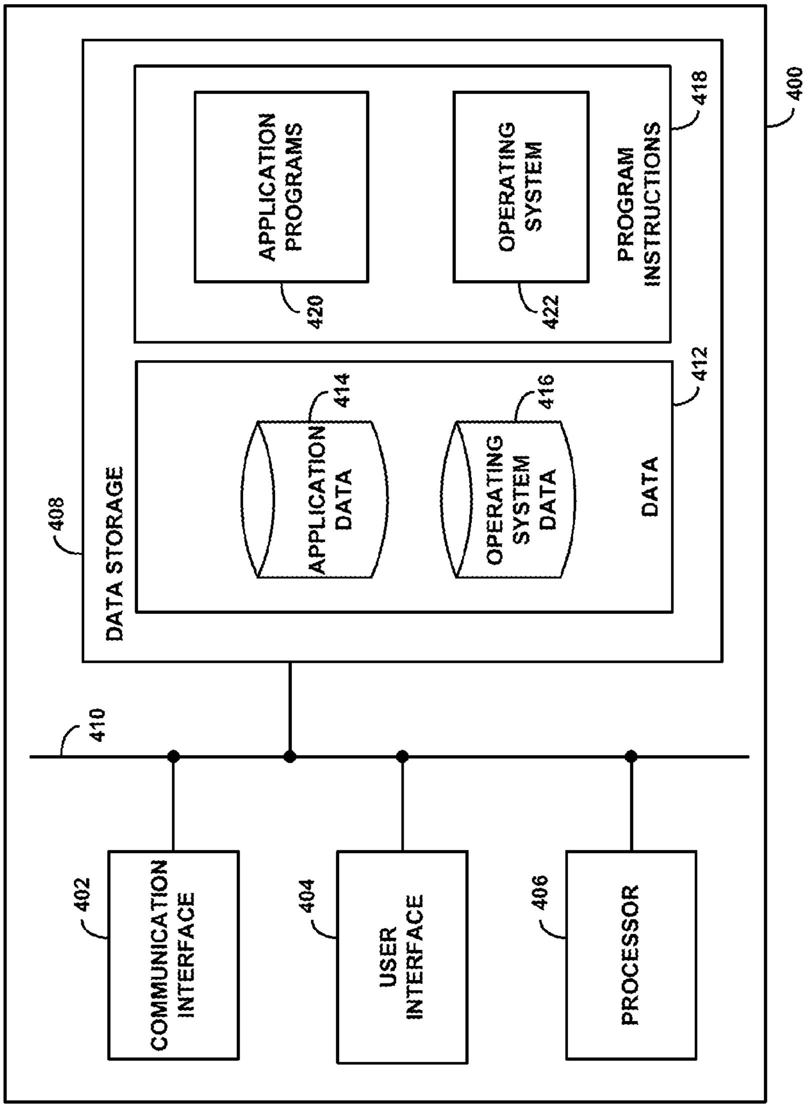
FIG. 4 depicts a block diagram of a client device, in accordance with an example embodiment.

FIG. 4 is a simplified block diagram showing some of the components of an example client device 400. Client device 400 can be configured to perform one or more functions of client devices 202, 204, 206. By way of example and without limitation, client device 400 may be or include a "plain old telephone system" (POTS) telephone, a cellular mobile telephone, a still camera, a video camera, a fax machine, an answering machine, a computer (such as a desktop, notebook, or tablet computer), a personal digital assistant, a wearable computing device, a home automation component, a digital video recorder (DVR), a digital TV, a remote control, or some other type of device equipped with one or more wireless or wired communication interfaces. The client device 400 could also take the form of interactive virtual and/or augmented reality glasses, such as a head-mounted display device, sometimes referred to as a "heads-up" display device. Though not necessarily illustrated in FIG. 4, a head-mounted device may include a display component for displaying images on a display component of the head-mounted device. The head-mounted device may also include one or more eye-facing cameras or other devices configured for tracking eye motion of a wearer of the head-mounted device. The eye-tracking cameras may be used to determine eye-gaze direction and motion of the wearer's eyes in real-time. The eye-gaze direction may be provided as input for various operations, functions, and/or applications, such as tracking the wearer's gaze direction and motion across text displayed in a display device.

As shown in FIG. 4, client device 400 may include a communication interface 402, a user interface 404, a processor 406, and data storage 408, all of which may be communicatively linked together by a system bus, network, or other connection mechanism 410.

Communication interface 402 functions to allow client device 400 to communicate, using analog or digital modulation, with other devices, access networks, and/or transport networks. Thus, communication interface 402 may facilitate circuit-switched and/or packet-switched communication, such as POTS communication and/or IP or other packetized communication. For instance, communication interface 402 may include a chipset and antenna arranged for wireless communication with a radio access network or an access point. Also, communication interface 402 may take the form of a wireline interface, such as an Ethernet, Token Ring, or USB port. Communication interface 402 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

User interface 404 may function to allow client device 400 to interact with a human or non-human user, such as to receive input from a user and to provide output to the user. Thus, user interface 404 may include input components such as a keypad, keyboard, touch-sensitive or presence-sensitive panel, computer mouse, trackball, joystick, microphone, still camera and/or video camera. User interface 404 may also include one or more output components such as a display screen (which, for example, may be combined with a touch-sensitive panel), CRT, LCD, LED, a display using DLP technology, printer, light bulb, and/or other similar devices, now known or later developed. User interface 404 may also be configured to generate audible output(s), via a speaker, speaker jack, audio output port, audio output device, earphones, and/or other similar devices, now known or later developed. In some embodiments, user interface 404 may include software, circuitry, or another form of logic that can transmit data to and/or receive data from external user input/output devices. Additionally or alternatively, client device 400 may support remote access from another device, via communication interface 402 or via another physical interface (not shown). The user interface 404 may be configured to receive user input, the position and motion of which can be indicated by the indicator or cursor described herein. The user interface 404 may additionally or alternatively be configured as a display device to render or display the text segment.

Processor 406 may comprise one or more general purpose processors (e.g., microprocessors) and/or one or more special purpose processors (e.g., DSPs, GPUs, FPUs, network processors, or ASICs). Data storage 408 may include one or more volatile and/or non-volatile storage components, such as magnetic, optical, flash, or organic storage, and may be integrated in whole or in part with processor 406. Data storage 408 may include removable and/or non-removable components.

In general, processor 406 may be capable of executing program instructions 418 (e.g., compiled or non-compiled program logic and/or machine code) stored in data storage 408 to carry out the various functions described herein. Data storage 408 may include a non-transitory computer-readable medium, having stored thereon program instructions that, upon execution by client device 400, cause client device 400 to carry out any of the methods, processes, or functions disclosed in this specification and/or the accompanying drawings. The execution of program instructions 418 by processor 406 may result in processor 406 using data 412.

By way of example, program instructions 418 may include an operating system 422 (e.g., an operating system kernel, device driver(s), and/or other modules) and one or more application programs 420 (e.g., address book, email, web browsing, social networking, and/or gaming applications) installed on client device 400. Similarly, data 412 may include operating system data 416 and application data 414. Operating system data 416 may be accessible primarily to operating system 422, and application data 414 may be accessible primarily to one or more of application programs 420. Application data 414 may be arranged in a file system that is visible to or hidden from a user of client device 400.

Application programs 420 may communicate with operating system 412 through one or more application programming interfaces (APIs). These APIs may facilitate, for instance, application programs 420 reading and/or writing application data 414, transmitting or receiving information via communication interface 402, receiving or displaying information on user interface 404, and so on.

In some vernaculars, application programs 420 may be referred to as "apps" for short. Additionally, application programs 420 may be downloadable to client device 400 through one or more online application stores or application markets. However, application programs can also be installed on client device 400 in other ways, such as via a web browser or through a physical interface (e.g., a USB port) on client device 400.

4. Example System and Operation

Figure 5:
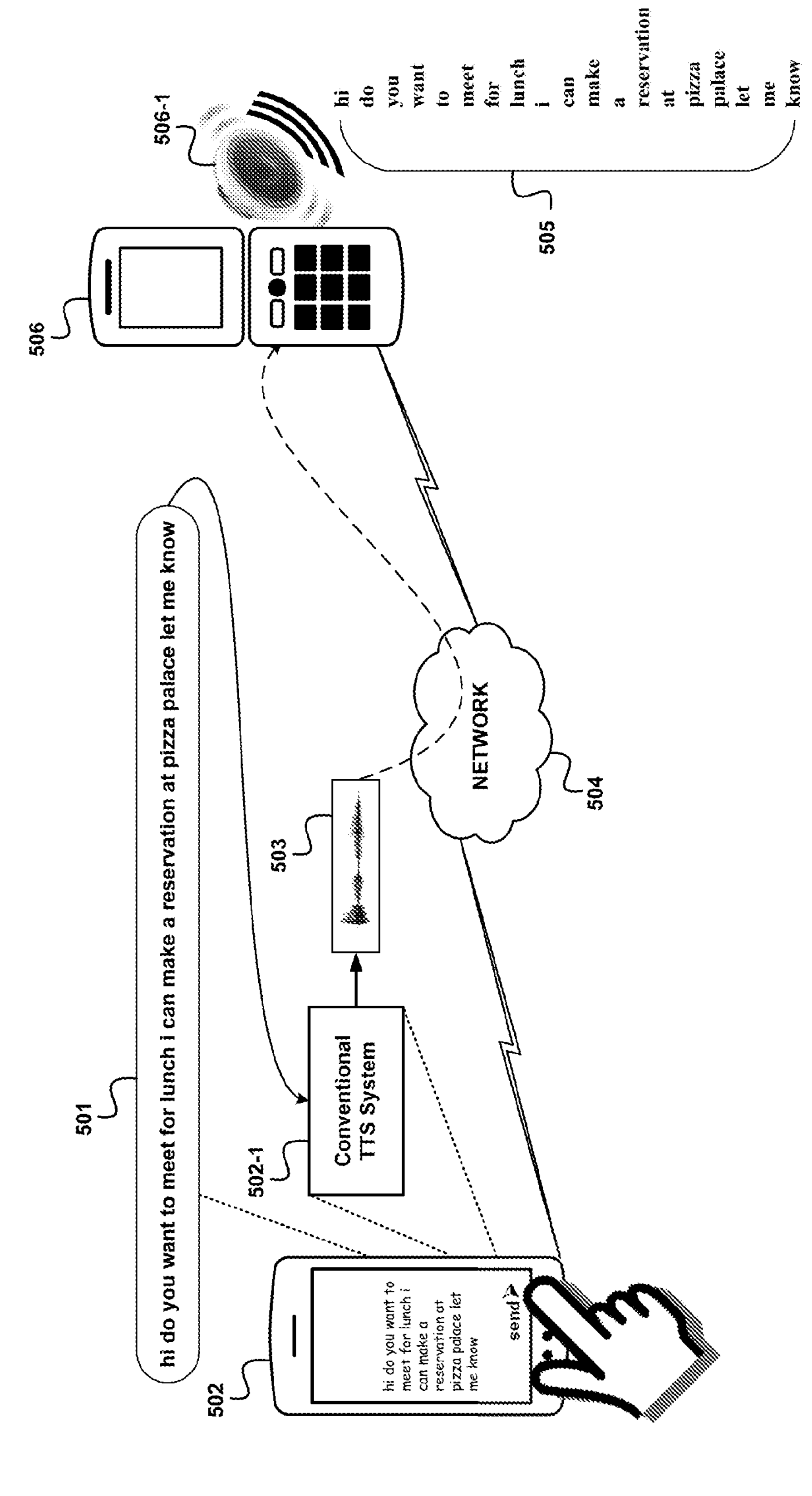
FIG. 5 depicts example operation of text-to-speech synthesis, in accordance with an example embodiment.

An example of a usage scenario of TTS in which the lack or absence of grammatical punctuation in input text is illustrated in FIG. 5, in which a smartphone 502 is used to enter text via a texting application program, for example, and to convert the text to speech that may then be transmitted over a communications network 504 to a cellphone 506 and played out by an audio component 506-1. Both the smartphone 502 and the cellphone 506 are examples of communication devices that are communicatively connected by way of a network 504, and thus considered remote from each other. Other devices could be used as well. The "lightning bolt" lines in the figure represent the communicative connections of each device to the network.

In the illustration, a user may type input text, which, evidently and by way of example, consists of the string 501 "hi do you want to meet me for lunch i can make a reservation at pizza palace let me know" without any punctuation. The sending user may click a virtual "send" button on the smartphone 502 (as represented by the pointing finger in FIG. 5) to invoke a TTS system 502-1 of the smartphone 502 that generates synthesized speech, represented in the figure by the waveform 503, which is then transmitted as indicated to the cellphone 506. The curved, dashed arrow signifies the transmission to the smartphone 506. In some embodiments, the text may be converted to speech at the cellphone 506 using a TTS process residing on the cellphone, rather than at the smartphone 502. Alternatively, the TTS process may be hosted remotely on a third-party computing system (not shown), configured to receive textual data from the smartphone 502 over the communications network 504, convert it to speech using the TTS process, and transmit the speech to cellphone 506 over the or another communications network 504.

The absence of grammatical punctuation in the input text stream may cause the TTS system 501-2 to synthesize flat, unnatural sounding output speech 505. This is signified visually in FIG. 5 by the placement of each word of the input text 501 on a separate line of the written words meant to represent the words as spoken in the output speech 505. Thus, as rendered in synthesized speech, each word of the output 505 may sound as if spoken one at a time, and in isolation from one another. The inventors have discovered that by introducing a punctuation model, the absence of grammatical punctuation in input text may be compensated for, and natural sounding speech generated.

a. Example Text-to-Speech System with a Punctuation Model

Figure 6:
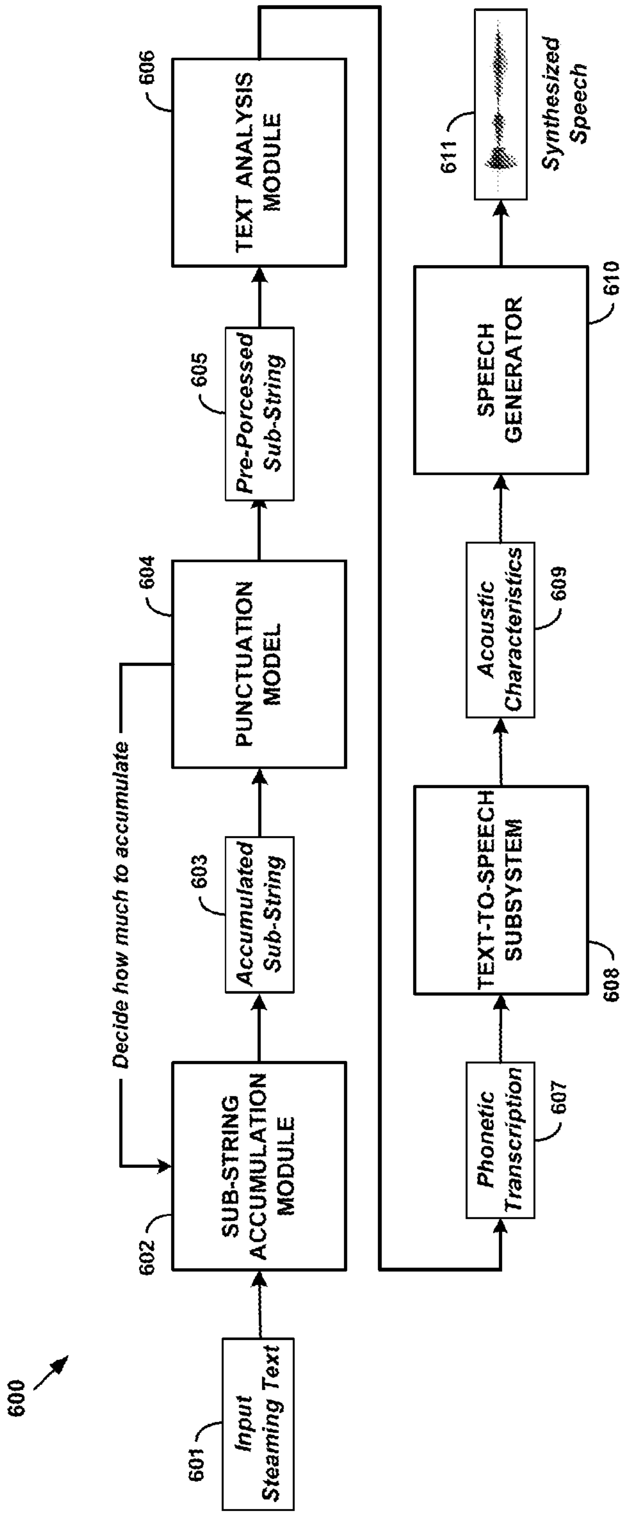
FIG. 6 illustrates a simplified block diagram of an example text-to-speech system including a punctuation model, in accordance with an example embodiment.

FIG. 6 illustrates a simplified block diagram of an example text-to-speech system 600 including a punctuation model, in accordance with an example embodiment. The TTS system 600, like the TTS system 100 in FIG. 1, includes a text analysis module 606, a TTS subsystem 608, and a speech generator 610. However, the TTS system 600 also includes a sub-string accumulation module 602 followed by a punctuation model 604 preceding the text analysis module 606. As with the TTS system 100, the elements and modules of the TTS shown in FIG. 6 may not necessarily correspond exactly to actual or specific components of a particular implementation of a TTS system, but rather are representative at least of a convenient conceptualization of operations carried out in the course to TTS processing that includes punctuation prediction for input text strings that may otherwise lack grammatical punctuation.

As a general matter, the TTS system 600 applies the punctuation model to an input string or portion thereof to generate a pre-processed sub-string 605, which may then be processed by the text analysis module 606 and other downstream processing elements in a manner similar to that of the input text string 101 by the TTS 100 shown in FIG. 1. In more detail, as discussed below, the sub-string accumulation module 602 and the punctuation model 604 may act together to segment or subdivide the input streaming text 601 into two or more sequential sub-strings for separate processing by the TTS subsystem 608 and/or the speech generator 610.

In accordance with example embodiments, the sub-string accumulation module 602 may act to accumulate sequential sub-portions of input streaming text 610 into an accumulated sub-string 603, which is then processed by the punctuation model 604 to produce a pre-processed sub-string 605. An accumulated sub-string may correspond to some number of input text objects, such as letters (e.g., text characters), words (e.g., syntactical groupings of text characters), or phrases, for example. A given sub-string may be incrementally accumulated from the incoming streaming text, and input to the punctuation model 604 to generate a punctuated version of the accumulated sub-string 603. If the accumulated sub-string 603 corresponds to the entire input streaming text string, then the punctuated version of sub-string may be passed to the text analysis module 606. If the accumulated sub-string 603 corresponds to less than the entire input streaming text string, then the punctuated version of the accumulated sub-string 603 may be searched for punctuation that delimits the accumulated sub-string 603 for TTS synthesis processing. If suitable punctuation is found in the punctuated version of the accumulated sub-string 603, then the accumulated sub-string 603 may be passed to the text analysis module 606. If no suitable punctuation is found in the punctuated version of the accumulated sub-string 603, then additional incoming streaming text may be accumulated into a larger sub-string, which may again be tested for delimiting punctuation. This process of incremental accumulation, represented by the arrow labeled "decide how much to accumulate" in FIG. 6, may be repeated iteratively until the punctuation model 604 can generate a punctuated version of the accumulated sub-string 603 containing suitable punctuation for delimiting the accumulated sub-string 603.

In FIG. 6, a sub-string (including the case of the entire streaming text string) that contains suitable punctuation for delimiting is shown as the pre-processed sub-string 605, which may then be processed by the text analysis module 606 into a phonetic transcription 607. The TTS subsystem 608 then applies TTS synthesis to generate acoustic characteristics 609, from which the speech generator 610 may produce audio output in the form of synthesized speech 611, as shown.

In example embodiments, sub-string accumulation could be carried out incrementally one input word at a time, where a space characters between letter groupings may be used as delimiters. In such a scheme, sub-strings may be built up one word at a time and effectively tested by the punctuation model 604 as each subsequent word is appended to an existing sub-string.

In a general case, an input text stream, whether from a stream source, such as a text application program, or from a static source, such as a text file or a copy-and-paste from an archival text, may be subject to subdivision into any two or more sub-strings that may be separately synthesized into speech. In practice, it may be more common to have just two or perhaps three sub-string subdivisions. And as noted, an entire input text string may be processed by the punctuation model followed TTS synthesis, without being subdivided at all.

One advantage of subdivision into sub-strings that it enables TTS processing of incoming streaming text as it is arriving, thereby reducing latency due to otherwise waiting until the entire streaming text string to arrive before processing it. For example, in the case of a streaming text string produced by a texting application program, TTS processing may begin on an initial portion of the streaming text even while a user is still typing a later portion. It can also be possible to playout audio of a portion of synthesize while concurrently synthesizing a later portion, and even while a user is still typing a later portion. Details of these various modes are described in the context of example operation below.

In accordance with example embodiments, the punctuation model may be based on an artificial neural network (ANN), or other form or machine learning. For example, an ANN may be trained to predict punctuated text as output from unpunctuated text as input. In an example embodiment, the input may be a sequence of characters of a text string, and the output may be computed probability that each character of the input string is output as either the same character or as a punctuation symbol. Training data may include labeled pairs of text strings, where one element of each pair is an unpunctuated version of the other element. The unpunctuated element may represent input data, and the punctuated element may represent "ground truth" for comparing with predicted output during in training. Training may the entail adjusting model parameters to achieve a statistically determined "best fit" between the predicted punctuation and the "true" punctuation.

b. Example Operation

As noted above, sub-string processing may entail any number of consecutive or sequential sub-strings. For the purposes of discussion herein, the only cases considered in detail will be those of either no sub-strings—i.e., a complete input string—or two sub-strings. Extending from two to more than two sub-strings is straightforward, and there is no loss in generality with respect to more than two sub-strings by considering just two. In the discussion below, an example case of processing an entire received string—that is, no sub-strings—is first described. This is followed by a description of two example cases, each of two sub-strings. The first example illustrates audio playout of a first sub-string while concurrently synthesizing a second sub-string. The second example illustrates audio playout of a first sub-string while concurrently receiving a second sub-string followed by concurrently synthesizing the second sub-string.

Figure 7A:
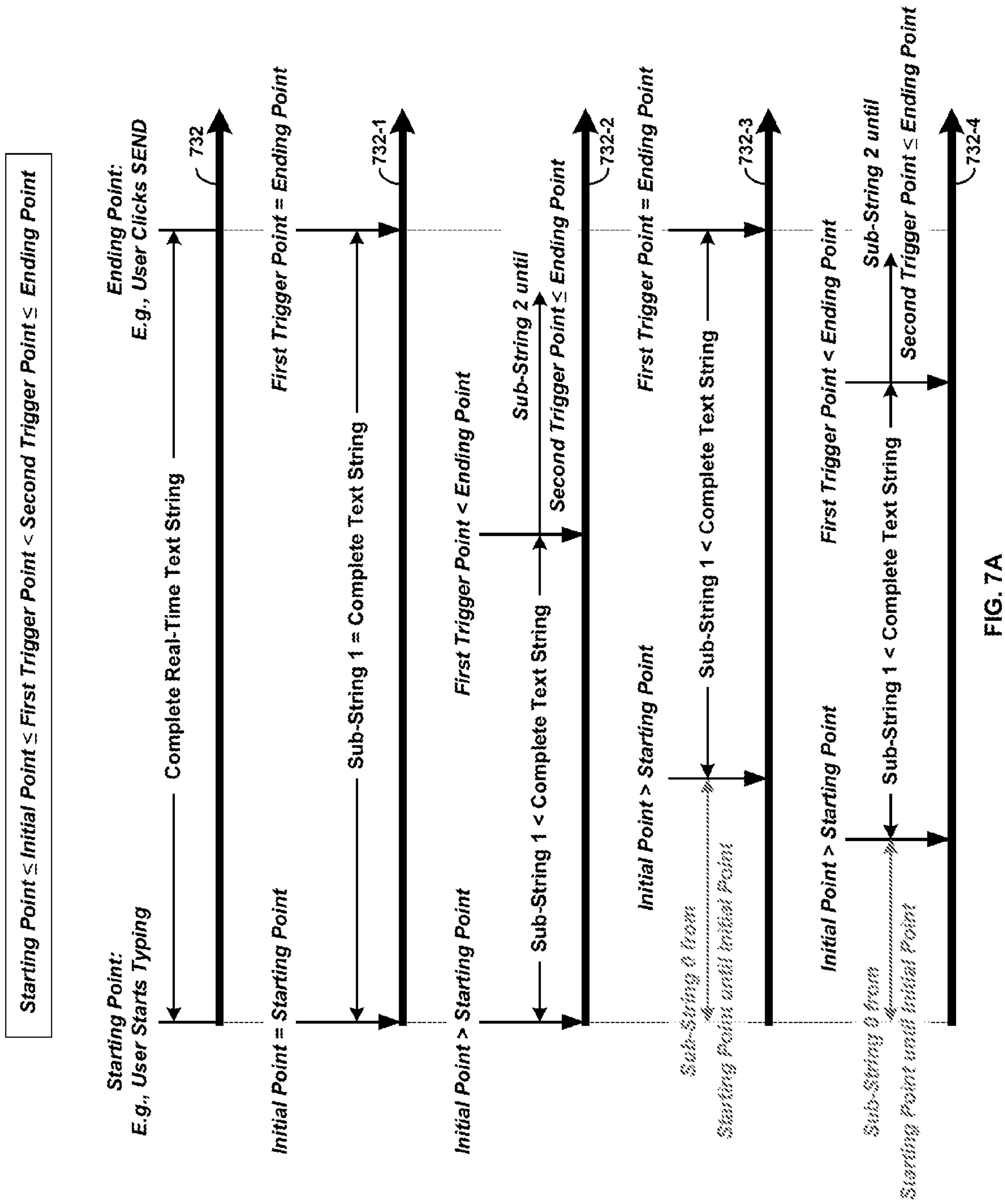
FIG. 7A depicts example timing diagrams of string accumulation during text-to-speech synthesis using a punctuation model, in accordance with an example embodiment.

FIG. 7A depicts example timing diagrams of string accumulation during text-to-speech synthesis using a punctuation model, in accordance with an example embodiment. For all example cases, a streaming text string is taken to be received in real time, measured from a starting point to an ending point, as indicated by timeline 732. Example timeline 732-1 shows accumulation of the entire incoming text string; i.e., with no sub-strings (or one sub-string that equals the entire string). In this case, the initial point equal to the starting point, the first trigger point equal to ending point, and no second trigger point. Example timelines 732-2, 732-3, and 732-4 each show example cases of accumulation of two (or more) sub-strings. In these cases, a first sub-string is taken to be accumulated from an initial point to a first trigger point, where the initial point is greater than or equal to the starting point, and the first trigger point is greater than the initial point and less than a second trigger point. The second trigger point is less than or equal to the ending point.

The relationship between the timing elements of the present discussion, and illustrated in FIG. 7A, can be expressed concisely as $t_{start} \le t_{initial} \le \text{trigger}_1 < \text{trigger}_2 \le t_{ending}$, as summarized at the top of FIG. 7A. Note the cases of $t_{start} \le t_{initial}$, shown for timelines 732-4 and 732-4, may include a sub-string 0 that precedes sub-string 1. This possibility is indicated in grayed-out illustration in FIG. 7A.

The term "trigger point" is introduced merely for convenience in the discussion. In accordance with example embodiments, a trigger point marks the end of one sub-string and the start of the next, if there is a next one. A trigger point could be a text delimiter, such as a punctuation mark separating words and/or phrases. Non-limiting examples of such punctuation marks include commas, periods, question marks, and exclamation marks. A trigger point could also be the end of a complete input string and/or detection of a "send" command from a texting application program, for example.

Figure 7B:
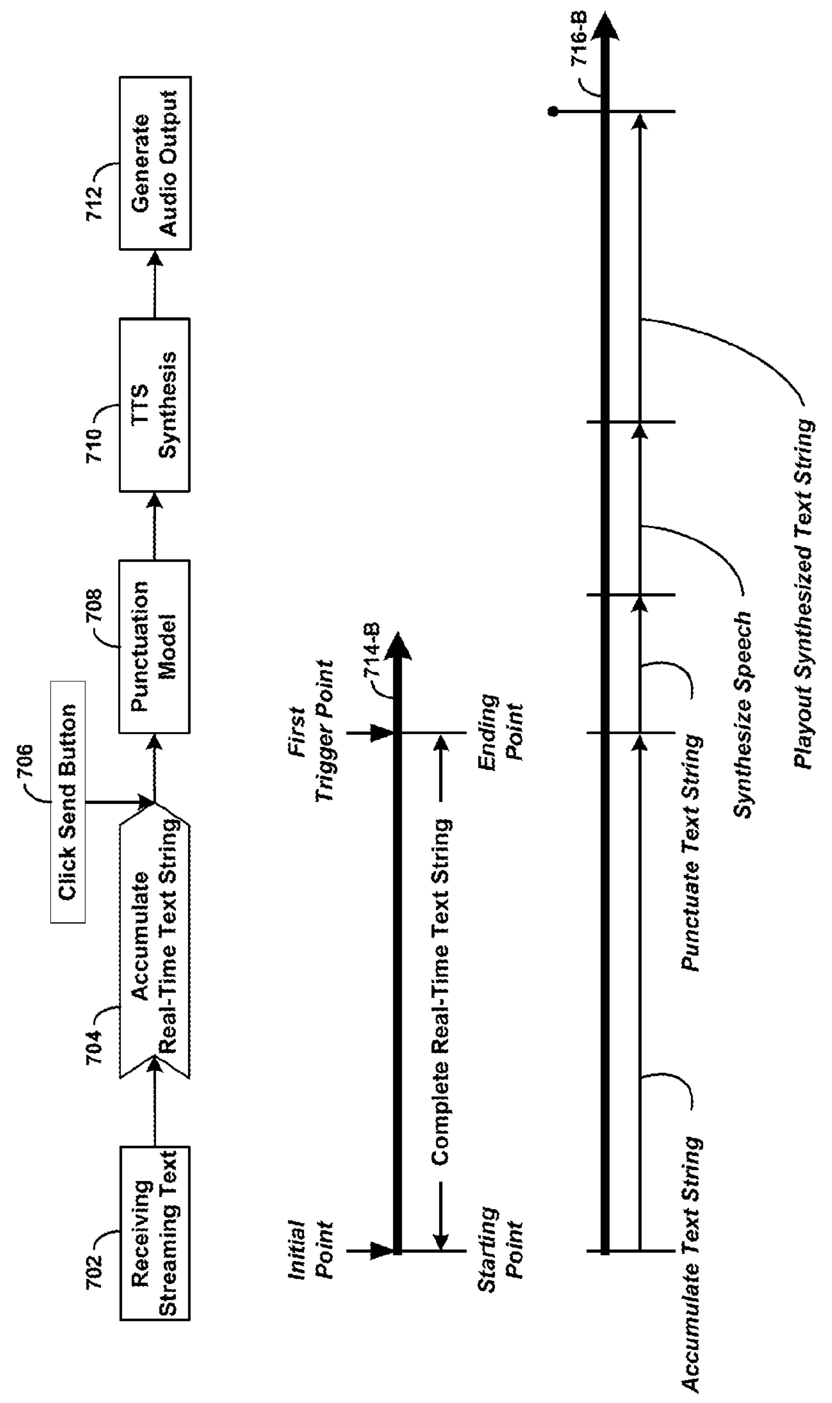
FIG. 7B depicts a first example process flow of text-to-speech synthesis using a punctuation model, in accordance with an example embodiment.
Figure 7C:
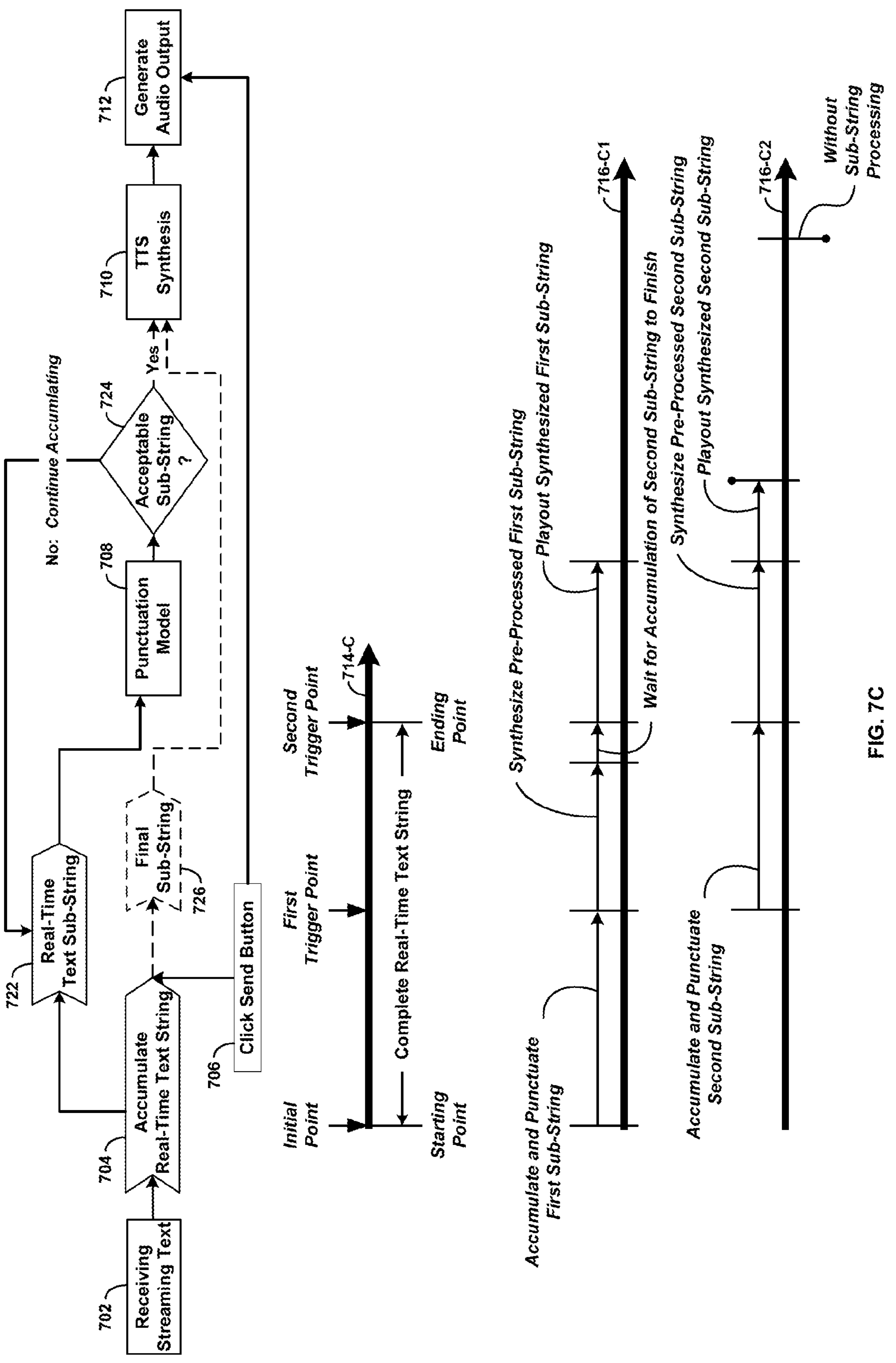
FIG. 7C depicts a second example process flow of text-to-speech synthesis using a punctuation model, in accordance with an example embodiment.
Figure 7D:
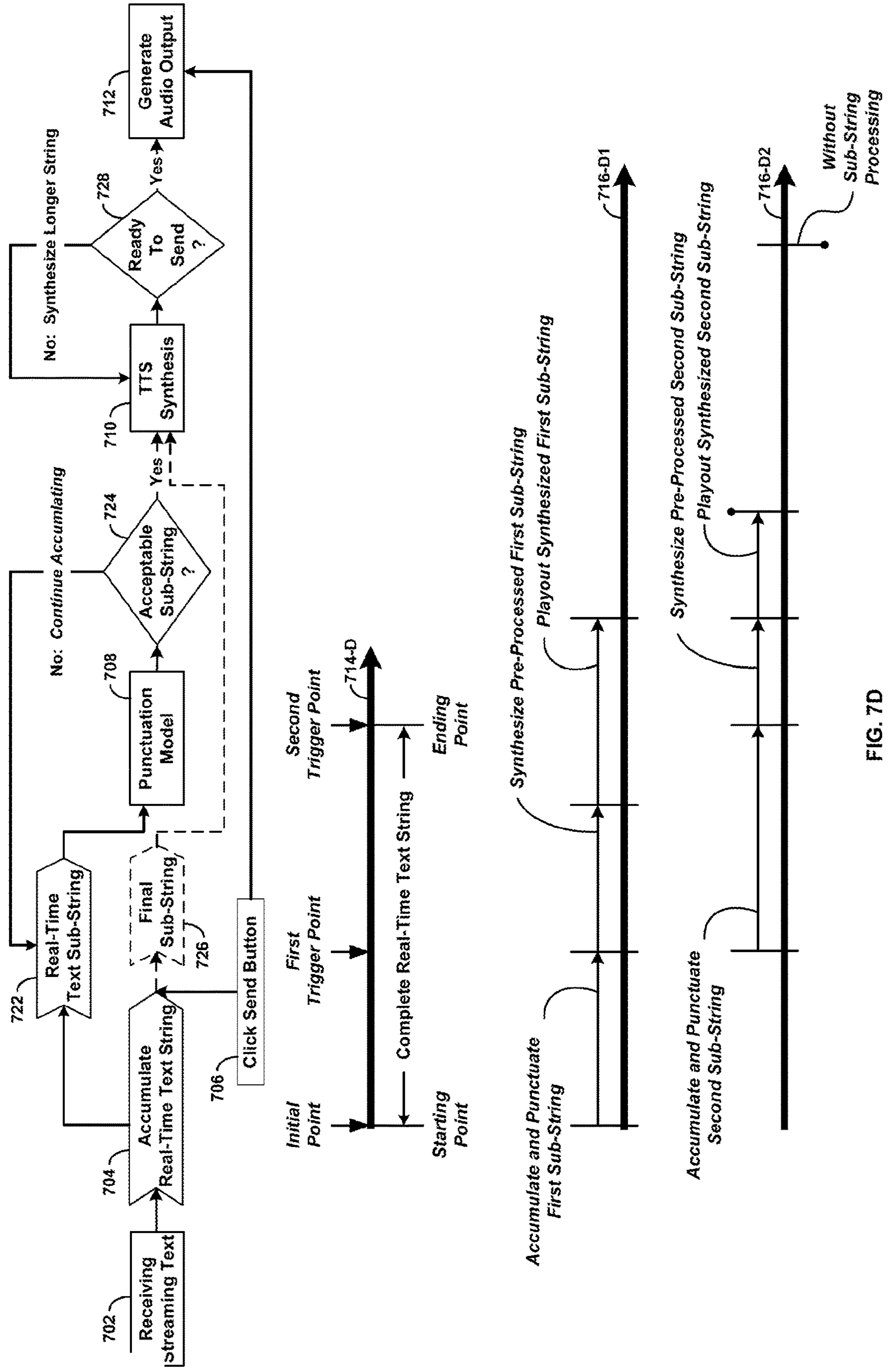
FIG. 7D depicts a third example process flow of text-to-speech synthesis using a punctuation model, in accordance with an example embodiment.

FIGS. 7B, 7C, and 7D illustrate process flows of TTS processing using a punctuation model, in accordance with example embodiments. In each example, streaming text is presented as input to a TTS system for processing, synthesis, and playout. In a typical implementation, the source of the streaming text could be a texting application program, for example. However, the source could also or alternatively be a text file or a save text from a texting application. In the examples of FIGS. 7B, 7C, and 7D, the receiving of the streaming text at the TTS system can be considered arrival of text characters as they are typed with a texting application program or other real-time streaming text generator. With this description, the term "accumulate" may be considered to be an incremental receipt of characters and/or words at the TTS system. Clicking the "send" button, or issuing a similar trigger or command from the streaming text program, may then be considered a signal that the entire text string is complete and should be converted to speech (synthesized) and its audio rendering produced and played out. In the example of FIG. 5, this corresponds to transmitting the audio playout to the remote communication device.

The example operations illustrated in FIGS. 7B, 7C, and 7D differ primarily in whether and which TTS processing of accumulating text commences before the "send" button is clicked. In particular, commencing processing before the "send" button is clicked can reduce latency associated with waiting until the "send" button is clicked. For real-time streaming text application programs and other real-time text streaming programs, this can advantageously make voice communications, in which the source of the speech is the texting application, sound more natural both in the quality of the synthesized speech and in the reduced end-to-end latency.

FIG. 7B depicts an example process flow of text-to-speech synthesis in which an entire streaming text string is received before processing by a punctuation model, in accordance with an example embodiment. The process flow is shown at the top of the figure, and processing timelines 714-B and 716-B are shown below the process flow. A streaming text string 702 arrives at a TTS system and is accumulated 704 in real-time. As noted above, this could correspond to receiving text characters as they are generated (e.g., typed) by a streaming text program, for example. When the entire text string is accumulated, as signaled by a click of the send button 706, the entire text string is input to the punctuation model 708, which generates a punctuated text string that includes added grammatical punctuation as determined by the punctuation model 708.

In the process flow of FIG. 7B, the real-time text string accumulation 704 is input to the punctuation model 708 at the first trigger point. The output of the punctuation model is then input to TTS synthesis 710 followed by generation of audio output 712.

The timeline 714-B shows that the initial point coincides with the starting at the initial point, and the first trigger point coincides with the ending point in this example. The first trigger point could correspond to the "send" button signal, for example.

As shown in the timeline 716-B, the entire text string is accumulated over the interval from the initial point to the first trigger point. As also shown, accumulation or receipt of the entire text string is followed by punctuation of the entire text string, synthesizing speech from the punctuated text string, and, finally, playout of the synthesized text string. It should be noted that the apparent relative durations of each operation in the timeline 716-B are for illustrative purposes, and are not necessarily to scale and/or intended to convey actual quantitative relationships.

FIG. 7C depicts an example process flow of text-to-speech synthesis using a punctuation model in which two sub-strings are accumulated, in accordance with an example embodiment. In this example, TTS synthesis processing of the first sub-string is concurrent with accumulation of the second sub-string, and audio playout of the first sub-string is concurrent with TTS processing of the second sub-string. The process flow is shown at the top of the figure, and processing timelines 714-C, 716-C1, and 716-C2 are shown below the process flow. A streaming text string 702 arrives at a TTS system and is accumulated 704 in real-time. Again, this could correspond to receiving text characters as they are generated (e.g., typed) by a streaming text program, for example. In this example, a first trigger point occurs before the ending point, and a second trigger point coincides with the ending point. As a result, the entire text string is accumulated in two successive sub-strings, as described below.

In the process flow of FIG. 7C, partial accumulation of the real-time text string 704 yields real-time text sub-string 722, which is input to the punctuation model 708 when some threshold amount of text has been accumulated. In an example embodiment, the threshold could correspond to accumulation of one or more entire words. The output of the punctuation model is then evaluated for "acceptable" punctuation 724 that includes delimiting punctuation, as described above, for example. If the real-time text sub-string 722 can be delimited based on the output of the punctuation model, the real-time text sub-string 722 is input to TTS synthesis 710. If the real-time text sub-string 722 cannot be delimited, additional text is accumulated, and the punctuation model test is applied again. This cycle repeats until the real-time text sub-string 722 can be delimited, followed by TTS synthesis 710 and audio playout 712.

When the real-time text sub-string 722 is input to TTS synthesis 710, accumulation of the next sequential sub-string begins. Note that in practice, accumulation may be continuous from one sub-string to the next. The generation of audio output 712 of the initial sub-string can begin once accumulation of the next sequential sub-string completes. This is indicated on the timeline 716-C1 by the "wait" gap between TTS synthesis and audio playout.

The sub-string accumulation process just described may be repeated for as many successive sub-strings as can be accumulated from the arriving streaming text. The boundary between successive sub-strings is a trigger point. For the current example, only a first sub-string and a second sub-string are considered. The end of the first sub-string and the start of the second sub-string is marked by the first trigger point. The end of the second sub-string in this example is marked by the second trigger point. In the illustration of FIG. 7C, the second sub-string corresponds with the final sub-string 726, which is input directly to the TTS synthesis 710 upon receipt of the send button 706. Thus, the second trigger point coincides with the ending point of the arriving streaming text.

The timeline 714-C shows that the initial point coincides with the starting point, and the first trigger point occurs before the ending point in this example. The first trigger point marks the end of the first sub-string and the start of the second sub-string, and the second trigger point marks the end of the second sub-string. The second trigger point could correspond to the "send" button signal, for example.

As shown in the timeline 716-C1, the first sub-string is accumulated over the interval from the initial point to the first trigger point. As labeled on the timeline 716-C1, accumulation is assumed to include punctuation and testing for delimiting in the manner described above, where the result of accumulation and punctuation is referred to as the "pre-processed first sub-string." This is followed synthesizing speech from the pre-processed first sub-string, and, finally, playout of the synthesized first sub-string.

As shown in the timeline 716-C2, the second sub-string is accumulated over the interval from the first trigger point to the second trigger point. As labeled on the timeline 716-C2, accumulation is also assumed to include punctuation and testing for delimiting and/or receipt of the "send" button signal 706, where the result of accumulation and punctuation is referred to as the "pre-processed second sub-string." This is followed by synthesizing speech from the pre-processed second sub-string, and, finally, playout of the synthesized second sub-string. Playout of the second sub-string corresponds to completion of play of the entire text string, albeit in playouts of the two successive sub-strings. Comparison of the timelines 716-C1 and 716-C2 shows that accumulation of the second sub-string occurs concurrently TTS synthesis of the first sub-string, and that TTS synthesis of the second sub-string occurs concurrently with playout of the first sub-string. Note that accumulation of the second (and first) sub-string may correspond to typing (or generation) of the streaming text. Thus, processing of the first sub-string occurs concurrently with typing of the second sub-string.

For comparison with TTS processing of the entire text string (as shown in FIG. 7B), a time marker of completion of playout for the example of processing of the entire text string is shown on the timeline 716-C2. As can be seen, a corresponding time to complete playout of the second sub-string occurs earlier than that when the entire text string is processed and played out. This illustrates the reduction in latency. As with the timelines of FIG. 7B, the apparent relative durations of each operation in the timeline 716-C are for illustrative purposes, and are not necessarily to scale and/or intended to convey actual quantitative relationships.

FIG. 7D depicts another example process flow of text-to-speech synthesis using a punctuation model in which two sub-strings are accumulated, in accordance with an example embodiment. In this example, TTS synthesis processing, possibly as well as at least partial playout of the first sub-string, is concurrent with accumulation of the second sub-string, and at least partial audio playout of the first sub-string is concurrent with TTS processing of the second sub-string. The process flow is shown at the top of the figure, and processing timelines 714-D, 716-D1, and 716-D2 are shown below the process flow. A streaming text string 702 arrives at a TTS system and is accumulated 704 in real-time. Again, this could correspond to receiving text characters as they are generated (e.g., typed) by a streaming text program, for example. In this example, a first trigger point occurs before the ending point, and a second trigger point coincides with the ending point. As a result, the entire text string is accumulated in two successive sub-strings, as described below.

In the process flow of FIG. 7D, partial accumulation of the real-time text string 704 yields real-time text sub-string 722, which is input to the punctuation model 708 when some threshold amount of text has been accumulated. In an example embodiment, the threshold could correspond to accumulation of one or more entire words. The output of the punctuation model is then evaluated for "acceptable" punctuation 724 that includes delimiting punctuation, as described above, for example. If the real-time text sub-string 722 can be delimited based on the output of the punctuation model, the real-time text sub-string 722 is input to TTS synthesis 710. If the real-time text sub-string 722 cannot be delimited, additional text is accumulated, and the punctuation model test is applied again. This cycle repeats until the real-time text sub-string 722 can be delimited, followed by TTS synthesis 710 and audio playout 712.

When the real-time text sub-string 722 is input to TTS synthesis 710, accumulation of the next sequential sub-string begins. As noted above, accumulation may be continuous from one sub-string to the next. In some instances, completion of TTS synthesis processing 710 may complete before accumulation of the next sequential sub-substring has finished. For example, a real-time streaming text application may still be generating text—e.g., a user may still be typing the streaming text—when the initial sub-string has been synthesized and can be played out. Before playout can begin in this instance, a determination 728 is made as to whether the synthesized speech is "ready to send." If it is, playout can begin. If not, playout is delayed until more of the arriving streaming text string is received and synthesize. This operation allows playout to begin while streaming text is still being received, but only if the "ready to send" condition is met.

In an example embodiment, the "ready to send" condition may correspond to criteria for evaluating the likelihood that the source text of streaming text already received and synthesize will be edited, revised, and/or modified before the send button 706 signal is issued. Again for the case of a streaming text application program, a user entering a text message may decide to make changes before clicking the send button. If an initial portion of the entered text has already been synthesize and played out, it would be too late for the user to modify the played-out portion of the text message. The "ready to send" criteria may thus be used to evaluate that likelihood that changes will be made. If likelihood is below a "ready to send" threshold (or, conversely, if the likelihood that no changes will be made is above a complementary "ready to send" threshold), then the playout can being while streaming text is still being accumulated. Otherwise, playout is delayed until more text is received and synthesize such that the threshold is met, and/or if the send button signal is received.

The sub-string accumulation process may be repeated for as many successive sub-strings as can be accumulated from the arriving streaming text. The boundary between successive sub-strings is a trigger point. For the current example, only a first sub-string and a second sub-string are considered. The end of the first sub-string and the start of the second sub-string is marked by the first trigger point. The end of the second sub-string in this example is marked by the second trigger point. In the illustration of FIG. 7D, the second sub-string corresponds with the final sub-string 726, which is input directly to the TTS synthesis 710 upon receipt of the send button 706. Thus, the second trigger point coincides with the ending point of the arriving streaming text.

The timeline 714-D shows that the initial point coincides with the starting point, and the first trigger point occurs before the ending point in this example. The first trigger point marks the end of the first sub-string and the start of the second sub-string, and the second trigger point marks the end of the second sub-string. The second trigger point could correspond to the "send" button signal, for example.

As shown in the timeline 716-D1, the first sub-string is accumulated over the interval from the initial point to the first trigger point. As labeled on the timeline 716-D1, accumulation is assumed to include punctuation and testing for delimiting in the manner described above, where the result of accumulation and punctuation is referred to as the "pre-processed first sub-string." This is followed synthesizing speech from the pre-processed first sub-string, and, if the "ready to send" criteria are met, playout of the synthesized first sub-string.

As shown in the timeline 716-D2, the second sub-string is accumulated over the interval from the first trigger point to the second trigger point. As labeled on the timeline 716-D2, accumulation is also assumed to include punctuation and testing for delimiting and/or receipt of the "send" button signal 706, where the result of accumulation and punctuation is referred to as the "pre-processed second sub-string." This is followed by synthesizing speech from the pre-processed second sub-string, and, finally, playout of the synthesized second sub-string. Playout of the second sub-string corresponds to completion of play of the entire text string, albeit in playouts of the two successive sub-strings. Comparison of the timelines 716-D1 and 716-D2 shows that accumulation of the second sub-string occurs concurrently TTS synthesis and at least partial playout of the first sub-string, and that TTS synthesis of the second sub-string occurs concurrently with any remaining playout of the first sub-string. Note that accumulation of the second (and first) sub-string may correspond to typing (or generation) of the streaming text. Thus, processing and at least partial of the first sub-string occurs concurrently with typing of the second sub-string.

For comparison with TTS processing of the entire text string (as shown in FIG. 7B), a time marker of completion of playout for the example of processing of the entire text string is shown on the timeline 716-D2. As can be seen, a corresponding time to complete playout of the second sub-string occurs earlier than that when the entire text string is processed and played out. This again illustrates the reduction in latency. As with the timelines of FIGS. 7B and 7C, the apparent relative durations of each operation in the timeline 716-D are for illustrative purposes, and are not necessarily to scale and/or intended to convey actual quantitative relationships.

Figure 8:
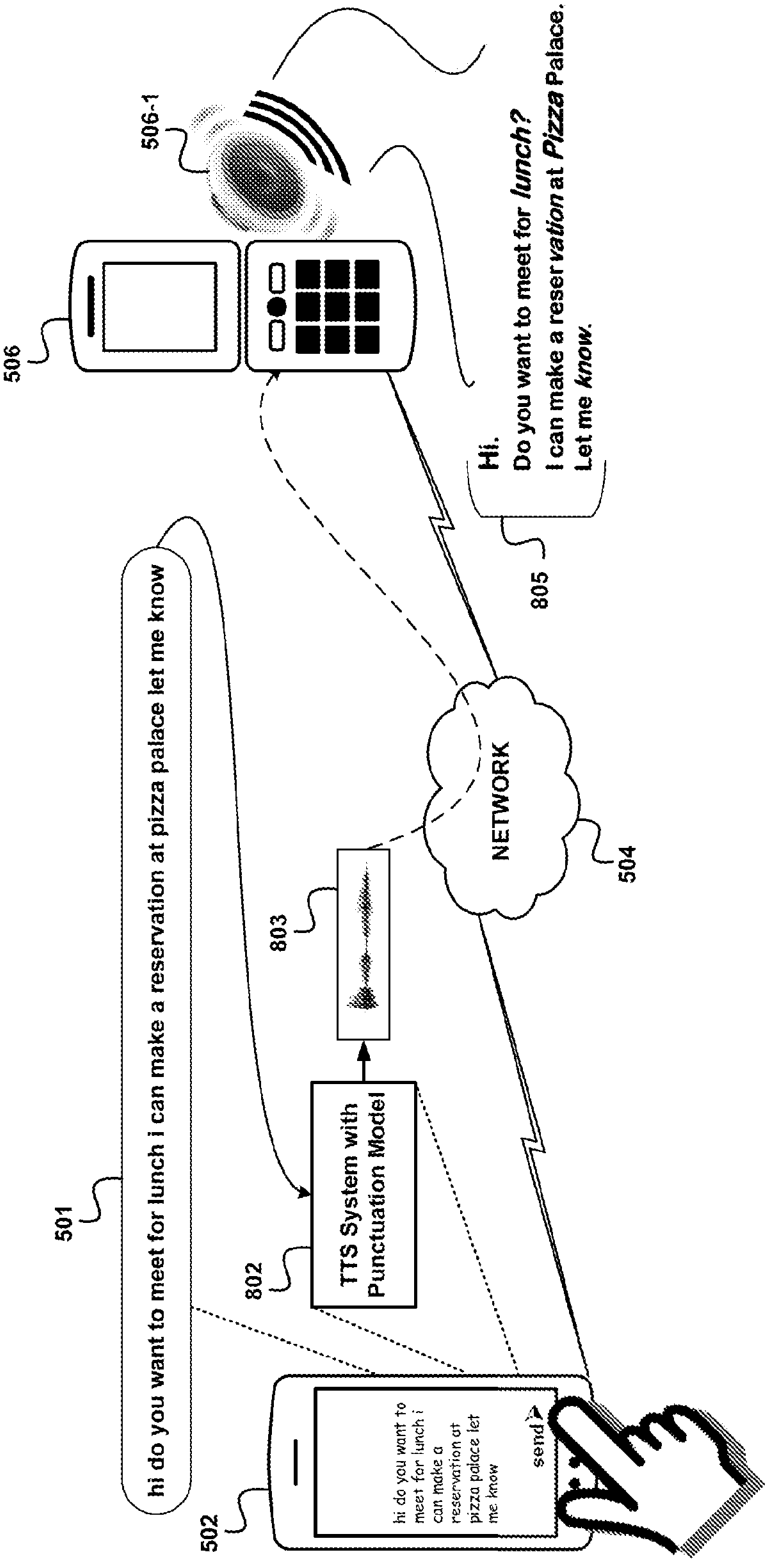
FIG. 8 depicts example operation of text-to-speech synthesis including a punctuation model, in accordance with an example embodiment

FIG. 8 depicts the example usage scenario illustrated in FIG. 5, but now with operation of text-to-speech synthesis that includes a punctuation model, in accordance with an example embodiment. Again, a smartphone 502 is used to enter text via a texting application program, for example, and to convert the text to speech that may then be transmitted over a communications network 504 to a cellphone 506 and played out by an audio component 506-1.

A user may type input text, which, again by way of example, consists of the string 501 "hi do you want to meet me for lunch i can make a reservation at pizza palace let me know" without any punctuation. The sending user may click a virtual "send" button on the smartphone 502 (as represented by the pointing finger in FIG. 5), this time invoking a TTS system 805 of the smartphone 502 that generates synthesized speech, represented in the figure by the waveform 803, which is then transmitted as indicated to the cellphone 506. The curved, dashed arrow signifies the transmission to the smartphone 506.

The absence of grammatical punctuation in the input text stream in this example is compensated for by the TTS system 802, which includes a punctuation model. By adding punctuation to the text string prior to TTS synthesis, the system may now synthesize natural sounding output speech 805. This is signified visually in FIG. 5 by the placement of each word of the input text 501 in meaningful phrases, and font sizes and styles meant to represent the words as spoken in the output speech 805. The arrangement illustrated in FIG. 8 may be particularly beneficial when a user of cellphone 506 has impaired vision that might make reading a purely textual message difficult. Without the advantageous improvement to the voice quality of the synthesize speech produced by the techniques and approach of example embodiments herein, an impaired-vision user of cellphone 506 would have to settle for the deficient quality exemplified in FIG. 5 or the like.

c. Example Method

In example embodiments, an example method can be implemented as machine-readable instructions that when executed by one or more processors of a system cause the system to carry out the various functions, operations and tasks described herein. In addition to the one or more processors, the system may also include one or more forms of memory for storing the machine-readable instructions of the example method (and possibly other data), as well as one or more input devices/interfaces, one or more output devices/interfaces, among other possible components. Some or all aspects of the example method may be implemented in a TTS synthesis system, which can include functionality and capabilities specific to TTS synthesis. However, not all aspects of an example method necessarily depend on implementation in a TIS synthesis system.

In example embodiments, a TTS synthesis system that includes a punctuation model may be implemented in an apparatus that includes one or more processors, one or more forms of memory, one or more input devices/interfaces, one or more output devices/interfaces, and machine-readable instructions that when executed by the one or more processors cause the TTS synthesis system, including the punctuation model, to carry out the various functions and tasks described herein. The TTS synthesis system may also include implementations based on one or more hidden Markov models. In particular, the TTS synthesis system may employ methods that incorporate HMM-based speech synthesis, as well as other possible components. Additionally or alternatively, the TTS synthesis system may also include implementations based on one or more artificial neural networks (ANNs). In particular, the TTS synthesis system may employ methods that incorporate ANN-based speech synthesis, as well as other possible components. In addition, the punctuation model be implemented using methods that incorporate ANN-based speech synthesis, as well as other possible components.

In an example embodiment, the apparatus may be a communication device, such as smartphone, PDA, tablet, laptop computer, or the like. In operation, the communication device may be communicatively connected to a remote communication device by way of a communications network, such as a telephone network, public internet, or wireless communication network (e.g., a cellular broadband network). A streaming text application program, such as an interactive texting/messaging program, may also be implemented on the communication device, and may be a source of streaming text input to the TTS system.

Figure 9:
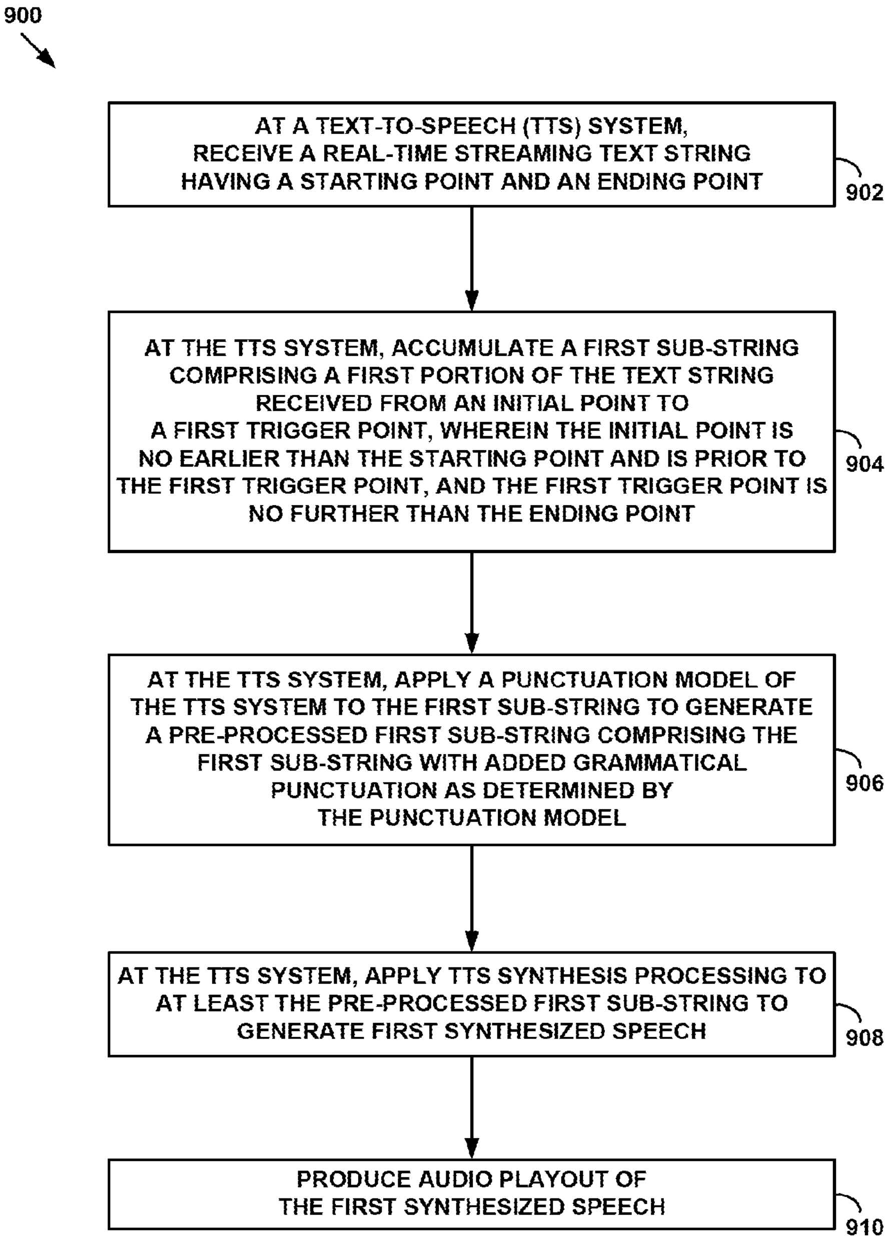
FIG. 9 is a flowchart illustrating an example method in accordance with an example embodiment.

FIG. 9 is a flowchart illustrating an example method 900 in accordance with example embodiments. At step 902, the TTS system may receive a real-time streaming text string, for example, from the streaming text application program. The real-time streaming text string may have a starting point and an ending point. The starting point and ending point may correspond both to the text string itself, as well as to a time interval over which the entire streaming text string is received by the TTS system. For example, the first character of the streaming text string could be received at a time marked by the starting point, and the last character and/or a "send" button signal could be received at a time marked by the ending point.

At step 904, at the TTS system may accumulate a first sub-string that includes a first portion of the text string received from an initial point to a first trigger point. The initial point may be no earlier than the starting point, and may be prior to the first trigger point, and the first trigger point may be no further than the ending point.

At step 906, at the TTS system may apply a punctuation model of the TTS system to the first sub-string to generate a pre-processed first sub-string that includes the first sub-string with added grammatical punctuation as determined by the punctuation model. Non-limiting examples of grammatical punctuation may include commas, periods, question marks, exclamation marks, semi-colons, and colons.

At step 908, at the TTS system may TTS synthesis processing to at least the pre-processed first sub-string to generate first synthesized speech.

Finally, at step 910, audio playout of the first synthesized speech may be produced.

In accordance with example embodiments, the first sub-string may be: (a) the completely received text string, where the initial point is the starting point and the first trigger point is the ending point and marks the end of the text string; (b) less than the completely received text string, where the initial point is the starting point and the first trigger point is before the ending point; (c) less than the completely received text string, where the initial point is after the starting point and the first trigger point is the ending point; or (d) less than the completely received text string, where the initial point is after the starting point and the first trigger point is before the ending point. Case (b) corresponds to a first sub-string that begins at the starting point and ends before the ending point. For this case, a subsequent sub-string may follow the first sub-string. Case (c) corresponds to a first sub-string that begins after the starting point and ends at the ending point. For this case, a prior sub-string may precede the first sub-string. Case (d) corresponds to a first sub-string that begins after the starting point and ends before the ending point. For this case, a prior sub-string may precede the first sub-string, and a subsequent sub-string may follow the first sub-string.

In accordance with example embodiments, receiving the real-time streaming text string may entail receiving streaming text output from an interactive texting application program executing on a communication device communicatively connected to a remote device, as described above. For this example, the first trigger point may correspond to a command from the interactive texting application program to send the text string to the remote device. Producing the audio playout of the first synthesized speech may then transmitting the audio playout from the communication device to the remote device over the communicative connection.

In accordance with example embodiments, when the first trigger point is before the ending point, the method 900 may further include, while applying TTS synthesis processing to the pre-processed first sub-string to generate the first synthesized speech, concurrently accumulating a second sub-string comprising a second portion of the text string received from the first trigger point to a second trigger point, where the second trigger point is after the first trigger point and no further than the ending point. The example method 900 may also further include applying the punctuation model to the second sub-string to generate a pre-processed second sub-string. Still further, the operations may also include, while producing the audio playout of the first synthesized speech, concurrently applying TTS synthesis processing to the pre-processed second sub-string to generate second synthesized speech, and producing audio playout of the second synthesized speech.

In further accordance with example embodiments, the first sub-string may be: less than the completely received text string, where the initial point is the starting point, or less than the completely received text string, where the initial point is after the starting point.

In accordance with example embodiments, receiving the real-time streaming text string may entail receiving streaming text output from an interactive texting application program executing on a communication device, as described above. In this case, the first trigger point and the second trigger point may each correspond to an end of a different, respective word of the streaming text output.

In accordance with example embodiments, when the first trigger point may be before the ending point, accumulating a first sub-string may entail incrementally accumulating one successive word at a time from the received real-time streaming text into a first interim sub-string, and after each successive accumulation of a successive word into the first interim sub-string, applying the punctuation model to the first interim sub-string to generate a pre-processed first interim sub-string. Each pre-processed first interim sub-string may be searched for a first particular punctuation added by the punctuation model that delimits the first interim sub-string for TTS synthesis processing. The first trigger point may then be set to an occurrence in the pre-processed first interim sub-string of the first particular punctuation, and the first sub-string may be determined to be the delimited first interim sub-string. With this arrangement, applying the punctuation model of the TTS system to the first sub-string to generate the pre-processed first sub-string may entail generating the pre-processed first interim sub-string that has the occurrence of the first particular punctuation. Non-limiting examples of the particular punctuation may include commas, periods, question marks, exclamation marks, semi-colons, and colons.

In accordance with example embodiments, the example method 900 may further include operations carried out concurrently with applying TTS synthesis processing to the pre-processed first sub-string to generate the first synthesized speech. These operations may include incrementally accumulating, starting from the first trigger point, one successive word at a time from the received real-time streaming text into a second interim sub-string, and after each successive accumulation of a successive word into the second interim sub-string, applying the punctuation model to the second interim sub-string to generate a pre-processed second interim sub-string. Then setting a second trigger point may be set to: (i) an occurrence in the pre-processed second interim sub-string of a second particular punctuation that delimits the second interim sub-string for TTS synthesis processing, or (ii) a signal indicating the endpoint of the received real-time streaming text. A second sub-string may then be set to be the second interim sub-string from the first trigger point to the second trigger point.

In further accordance with example embodiments, the example method may further entail, while producing audio playout of the first synthesized speech, concurrently applying TTS synthesis to the second sub-string to generate second synthesized speech. This may be followed by producing audio playout of the second synthesized speech.

In accordance with example embodiments, example method 900 may further entail operations carried out concurrently with producing the audio playout of the first synthesized speech. These operations may include incrementally accumulating, starting from the first trigger point, one successive word at a time from the received real-time streaming text into a second interim sub-string, and after each successive accumulation of a successive word into the second interim sub-string, applying the punctuation model to the second interim sub-string to generate a pre-processed second interim sub-string. A second trigger point to may then be set to: (i) an occurrence in the pre-processed second interim sub-string of a second particular punctuation that delimits the second interim sub-string for TTS synthesis processing, or (ii) a signal indicating the endpoint of the received real-time streaming text. A second sub-string may be set to be the second interim sub-string from the first trigger point to the second trigger point, and TTS synthesis may be applied to the second sub-string to generate second synthesized speech. In an operation subsequent to producing the audio playout of the first synthesized speech, audio playout of the second synthesized speech may be produced.

In accordance with example embodiments, receiving the real-time streaming text string may entail receiving streaming text output from an interactive texting application program executing on a communication device, as described above. The interactive texting application may include an interactive display configured for displaying user-input text and providing text editing functions. With this arrangement, the first trigger point and the second trigger point may each correspond to an end of a different, respective word of the streaming text output. The example method 900 may the further entail causing the text editing functions to be disabled for any displayed user-input text corresponding to the first sub-string upon commencement of the audio playout of the first synthesized speech.

In accordance with example embodiments, the punctuation model may include or be based on an artificial neural network (ANN) trained for adding grammatical punctuation to input text strings that include pluralities of words, but lack any grammatical punctuation. Adding the grammatical punctuation may then involve predicting particular grammatical punctuation marks and their respective locations before and/or after the words of the input text strings.

It will be appreciated that the steps shown in FIG. 9 are meant to illustrate a method in accordance with example embodiments. As such, various steps could be altered or modified, the ordering of certain steps could be changed, and additional steps could be added, while still achieving the overall desired operation. The method can be performed by a client device, or by a server, or by a combination of a client device and a server. The method can be performed by any suitable computing device(s).

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:

1. A method comprising:

at a text-to-speech (TTS) system, receiving a real-time streaming text string having a starting point and an ending point;

at the TTS system, accumulating a first sub-string comprising a first portion of the text string received from an initial point to a first trigger point, wherein the initial point is no earlier than the starting point and is prior to the first trigger point, and the first trigger point is before the ending point;

at the TTS system, applying a punctuation model of the TTS system to the first sub-string to generate a pre-processed first sub-string comprising the first sub-string with added grammatical punctuation as determined by the punctuation model;

at the TTS system, applying TTS synthesis processing to at least the pre-processed first sub-string to generate first synthesized speech;

providing an audio playout signal of the first synthesized speech;

while applying TTS synthesis processing to the pre-processed first sub-string to generate the first synthesized speech, concurrently accumulating a second sub-string comprising a second portion of the text string received from the first trigger point to a second trigger point that is after the first trigger point and no further than the ending point;

applying the punctuation model to the second sub-string to generate a pre-processed second sub-string;

while providing the audio playout signal of the first synthesized speech, concurrently applying TTS synthesis processing to the pre-processed second sub-string to generate second synthesized speech; and providing an audio playout signal of the second synthesized speech.

2. The method of claim 1, wherein receiving the real-time streaming text string comprises receiving streaming text output from an interactive texting application program executing on a communication device communicatively connected to a remote device, wherein the first trigger point corresponds to a command from the interactive texting application program to send the text string to the remote device, and wherein providing the audio playout signal of the first synthesized speech comprises transmitting the audio playout signal of the first synthesized speech from the communication device to the remote device over the communicative connection.

3. The method of claim 1, wherein the first sub-string is one of:

less than the completely received text string, wherein the initial point is the starting point; or less than the completely received text string, wherein the initial point is after the starting point.

4. The method of claim 1, wherein receiving the real-time streaming text string comprises receiving streaming text output from an interactive texting application program executing on a communication device, and wherein the first trigger point and the second trigger point each corresponds to an end of a different, respective word of the streaming text output.

5. The method of claim 1, wherein accumulating the first sub-string comprises:

incrementally accumulating one successive word at a time from the received real-time streaming text into a first interim sub-string;

after each successive accumulation of a successive word into the first interim sub-string, applying the punctuation model to the first interim sub-string to generate a pre-processed first interim sub-string, and searching the pre-processed first interim sub-string for a first particular punctuation added by the punctuation model that delimits the first interim sub-string for TTS synthesis processing;

setting the first trigger point to an occurrence in the pre-processed first interim sub-string of the first particular punctuation; and determining the first sub-string to be the delimited first interim sub-string;

and wherein applying the punctuation model of the TTS system to the first sub-string to generate the pre-processed first sub-string comprises generating the pre-processed first interim sub-string that has the occurrence of the first particular punctuation.

6. The method of claim 5, further comprising, concurrently with applying TTS synthesis processing to the pre-processed first sub-string to generate the first synthesized speech:

from the first trigger point, incrementally accumulating one successive word at a time from the received real-time streaming text into a second interim sub-string;

after each successive accumulation of a successive word into the second interim sub-string, applying the punctuation model to the second interim sub-string to generate a pre-processed second interim sub-string;

setting the second trigger point to one of (i) an occurrence in the pre-processed second interim sub-string of a second particular punctuation that delimits the second interim sub-string for TTS synthesis processing, or (ii) a signal indicating the endpoint of the received real-time streaming text; and determining the second sub-string to be the second interim sub-string from the first trigger point to the second trigger point.

7. The method of claim 5, further comprising, concurrently with providing the audio playout signal of the first synthesized speech:

from the first trigger point, incrementally accumulating one successive word at a time from the received real-time streaming text into a second interim sub-string;

after each successive accumulation of a successive word into the second interim sub-string, applying the punctuation model to the second interim sub-string to generate a pre-processed second interim sub-string;

setting the second trigger point to one of (i) an occurrence in the pre-processed second interim sub-string of a second particular punctuation that delimits the second interim sub-string for TTS synthesis processing, or (ii) a signal indicating the endpoint of the received real-time streaming text; and determining the second sub-string to be the second interim sub-string from the first trigger point to the second trigger point.

8. The method of claim 7, wherein receiving the real-time streaming text string comprises receiving streaming text output from an interactive texting application program executing on a communication device, the interactive texting application comprising an interactive display configured for displaying user-input text and providing text editing functions, wherein the first trigger point and the second trigger point each corresponds to an end of a different, respective word of the streaming text output, and wherein the method further comprises:

upon commencement of providing the audio playout signal of the first synthesized speech, causing the text editing functions to be disabled for any displayed user-input text corresponding to the first sub-string.

9. The method of claim 1, wherein the punctuation model comprises an artificial neural network (ANN) trained for adding grammatical punctuation to input text strings both comprising pluralities of words, and lacking any grammatical punctuation, and wherein adding the grammatical punctuation comprises predicting particular grammatical punctuation marks and their respective locations before and/or after the words of the input text strings.

10. A system including a text-to-speech (TTS) system implemented on an apparatus comprising:

one or more processors;

memory; and machine-readable instructions stored in the memory, that upon execution by the one or more processors cause the TTS system to carry out operations including:

receiving a real-time streaming text string having a starting point and an ending point;

accumulating a first sub-string comprising a first portion of the text string received from an initial point to a first trigger point, wherein the initial point is no earlier than the starting point and is prior to the first trigger point, and the first trigger point is before the ending point;

applying a punctuation model of the TTS system to the first sub-string to generate a pre-processed first sub-string comprising the first sub-string with added grammatical punctuation as determined by the punctuation model;

applying TTS synthesis processing to at least the pre-processed first sub-string to generate first synthesized speech;

providing an audio playout signal of the first synthesized speech;

while applying TTS synthesis processing to the pre-processed first sub-string to generate the first synthesized speech, concurrently accumulating a second sub-string comprising a second portion of the text string received from the first trigger point to a second trigger point that is after the first trigger point and no further than the ending point;

applying the punctuation model to the second sub-string to generate a pre-processed second sub-string;

while providing the audio playout signal of the first synthesized speech, concurrently applying TTS synthesis processing to the pre-processed second sub-string to generate second synthesized speech; and providing an audio playout signal of the second synthesized speech.

11. The system of claim 10, wherein the apparatus is a communication device communicatively connected to a remote device, wherein receiving the real-time streaming text string comprises receiving streaming text output from an interactive texting application program executing on the communication device, wherein the first trigger point corresponds to at least one of: an end of a word of the streaming text output, or a command from the interactive texting application program to send the text string to the remote device, and wherein providing the audio playout signal of the first synthesized speech comprises transmitting the audio playout signal of the first synthesized speech from the communication device to the remote device over the communicative connection.

12. The system of claim 10, wherein accumulating the first sub-string comprises:

incrementally accumulating one successive word at a time from the received real-time streaming text into a first interim sub-string;

after each successive accumulation of a successive word into the first interim sub-string, applying the punctuation model to the first interim sub-string to generate a pre-processed first interim sub-string, and searching the pre-processed first interim sub-string for a first particular punctuation added by the punctuation model that delimits the first interim sub-string for TTS synthesis processing;

setting the first trigger point to an occurrence in the pre-processed first interim sub-string of the first particular punctuation; and determining the first sub-string to be the delimited first interim sub-string;

and wherein applying the punctuation model of the TTS system to the first sub-string to generate the pre-processed first sub-string comprises generating the pre-processed first interim sub-string that has the occurrence of the first particular punctuation.

13. The system of claim 12, wherein the operations further include, concurrently with applying TTS synthesis processing to the pre-processed first sub-string to generate the first synthesized speech:

from the first trigger point, incrementally accumulating one successive word at a time from the received real-time streaming text into a second interim sub-string;

after each successive accumulation of a successive word into the second interim sub-string, applying the punctuation model to the second interim sub-string to generate a pre-processed second interim sub-string;

setting the second trigger point to one of (i) an occurrence in the pre-processed second interim sub-string of a second particular punctuation that delimits the second interim sub-string for TTS synthesis processing, or (ii) a signal indicating the endpoint of the received real-time streaming text; and determining the second sub-string to be the second interim sub-string from the first trigger point to the second trigger point.

14. The system of claim 12, wherein the operations further include, concurrently with providing the audio playout signal of the first synthesized speech:

from the first trigger point, incrementally accumulating one successive word at a time from the received real-time streaming text into a second interim sub-string;

after each successive accumulation of a successive word into the second interim sub-string, applying the punctuation model to the second interim sub-string to generate a pre-processed second interim sub-string;

setting the second trigger point to one of (i) an occurrence in the pre-processed second interim sub-string of a second particular punctuation that delimits the second interim sub-string for TTS synthesis processing, or (ii) a signal indicating the endpoint of the received real-time streaming text; and determining the second sub-string to be the second interim sub-string from the first trigger point to the second trigger point.

15. The system of claim 14, wherein the apparatus is a communication device communicatively connected to a remote device, wherein receiving the real-time streaming text string comprises receiving streaming text output from an interactive texting application program executing on the communication device, the interactive texting application comprising an interactive display configured for displaying user-input text and providing text editing functions, wherein the first trigger point and the second trigger point each corresponds to an end of a different, respective word of the streaming text output, and wherein the operations further include:

upon commencement of providing the audio playout signal of the first synthesized speech, causing the text editing functions to be disabled for any displayed user-input text corresponding to the first sub-string.

16. The system of claim 10, wherein the punctuation model comprises an artificial neural network (ANN) trained for adding grammatical punctuation to input text strings both comprising pluralities of words, and lacking any grammatical punctuation, and wherein adding the grammatical punctuation comprises predicting particular grammatical punctuation marks and their respective locations before and/or after the words of the input text strings.

17. An article of manufacture including a computer-readable storage medium having stored thereon program instructions that, upon execution by one or more processors of a system including a text-to-speech (TTS) system, cause the system to perform operations comprising:

receiving a real-time streaming text string having a starting point and an ending point;

accumulating a first sub-string comprising a first portion of the text string received from an initial point to a first trigger point, wherein the initial point is no earlier than the starting point and is prior to the first trigger point, and the first trigger point is before the ending point;

applying a punctuation model of the TTS system to the first sub-string to generate a pre-processed first sub-string comprising the first sub-string with added grammatical punctuation as determined by the punctuation model;

applying TTS synthesis processing to at least the pre-processed first sub-string to generate first synthesized speech;

providing an audio playout signal of the first synthesized speech;

while applying TTS synthesis processing to the pre-processed first sub-string to generate the first synthesized speech, concurrently accumulating a second sub-string comprising a second portion of the text string received from the first trigger point to a second trigger point that is after the first trigger point and no further than the ending point;

applying the punctuation model to the second sub-string to generate a pre-processed second sub-string;

while providing the audio playout signal of the first synthesized speech, concurrently applying TTS synthesis processing to the pre-processed second sub-string to generate second synthesized speech; and providing the audio playout signal of the second synthesized speech.

* * * * *